(12) United States Patent
Takeda

(10) Patent No.: US 11,241,759 B2
(45) Date of Patent: Feb. 8, 2022

(54) TEACHING DEVICE, TEACHING METHOD, AND STORAGE MEDIUM STORING TEACHING PROGRAM FOR LASER MACHINING

(71) Applicant: FANUC CORPORATION, Yamanashi (JP)

(72) Inventor: Toshiya Takeda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 225 days.

(21) Appl. No.: 16/547,573

(22) Filed: Aug. 22, 2019

(65) Prior Publication Data

US 2020/0070281 A1 Mar. 5, 2020

(30) Foreign Application Priority Data

Aug. 31, 2018 (JP) .............................. JP2018-163851

(51) Int. Cl.
| | |
|---|---|
| *G05B 19/402* | (2006.01) |
| *G05B 19/4155* | (2006.01) |
| *B23K 26/03* | (2006.01) |
| *B23K 26/08* | (2014.01) |
| *B23K 26/38* | (2014.01) |

(Continued)

(52) U.S. Cl.
CPC ........ *B23K 26/0884* (2013.01); *B23K 26/032* (2013.01); *B23K 26/38* (2013.01); *B25J 9/1671* (2013.01); *B25J 15/0019* (2013.01); *G05B 19/402* (2013.01); *G05B 19/4155* (2013.01); *G05B 2219/39298* (2013.01); *G05B 2219/45041* (2013.01)

(58) Field of Classification Search
None
See application file for complete search history.

(56) References Cited

U.S. PATENT DOCUMENTS

| | | | |
|---|---|---|---|
| 5,057,995 A * | 10/1991 | Mizuno ................ | G05B 19/408 700/87 |
| 9,311,608 B2 * | 4/2016 | Kuwahara ................ | B25J 9/163 |

(Continued)

FOREIGN PATENT DOCUMENTS

| | | |
|---|---|---|
| JP | H890233 A | 4/1996 |
| JP | 200075914 A | 3/2000 |

(Continued)

*Primary Examiner* — Jennifer L Norton
(74) *Attorney, Agent, or Firm* — Hauptman Ham, LLP

(57) ABSTRACT

Provided is a teaching device including a grouping unit which divides machining points into machining point groups so that a machining head can sequentially machine each machining point for a machining time and so that a non-machining time can be minimized, a machining path determination unit which determines a machining path on which an in-group movement time of a robot is shortest for each machining point group, a teaching process adjustment unit which adjusts a machining order of the machining points and an operation order of the machining point groups so as to minimize a distance between groups and which optimizes the grouping so as to minimize a total movement time for completing machining, and a teaching data output unit which outputs, as teaching data, machining execution positions on the machining path obtained as a result of processing of the teaching process adjustment.

8 Claims, 19 Drawing Sheets

(51) Int. Cl.
  *B25J 15/00* (2006.01)
  *B25J 9/16* (2006.01)

(56) References Cited

U.S. PATENT DOCUMENTS

| | | | |
|---|---|---|---|
| 2006/0212170 A1* | 9/2006 | Nagatsuka | B25J 9/1671 |
| | | | 700/245 |
| 2019/0240833 A1* | 8/2019 | Kimura | B25J 9/0081 |
| 2019/0275675 A1* | 9/2019 | Seno | G05B 19/02 |
| 2019/0321983 A1* | 10/2019 | Chen | B25J 9/1633 |
| 2020/0070282 A1* | 3/2020 | Takeda | B23K 26/032 |
| 2020/0122325 A1* | 4/2020 | Iwasa | B25J 9/0081 |
| 2021/0283774 A1* | 9/2021 | Iwata | B25J 9/1651 |
| 2021/0291368 A1* | 9/2021 | Kakisaka | B25J 9/1682 |

FOREIGN PATENT DOCUMENTS

| | | |
|---|---|---|
| JP | 2006-247677 A | 9/2006 |
| JP | 2016147269 A | 8/2016 |
| JP | 201886711 A | 6/2018 |
| JP | 201897810 A | 6/2018 |

\* cited by examiner

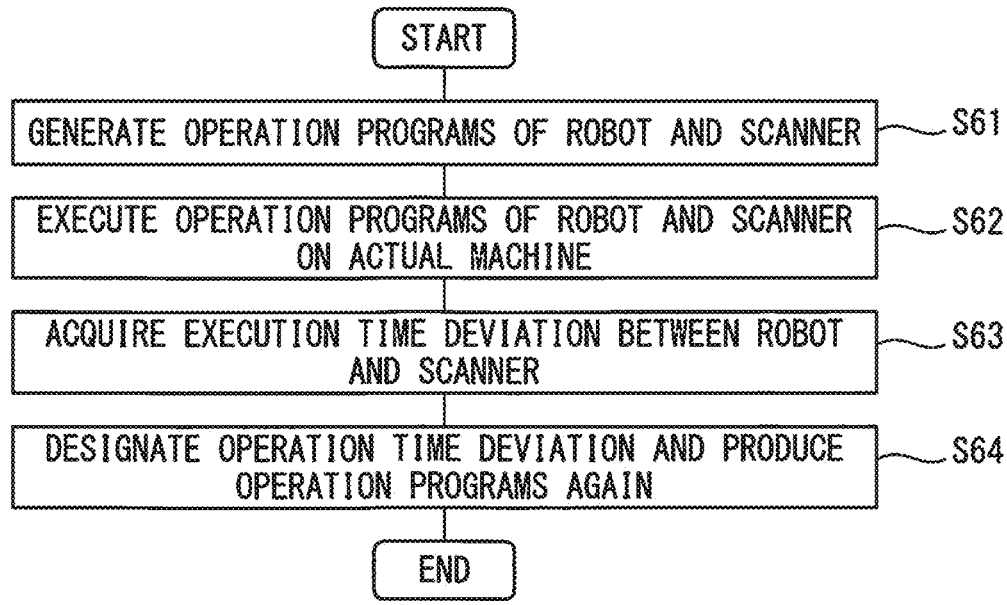
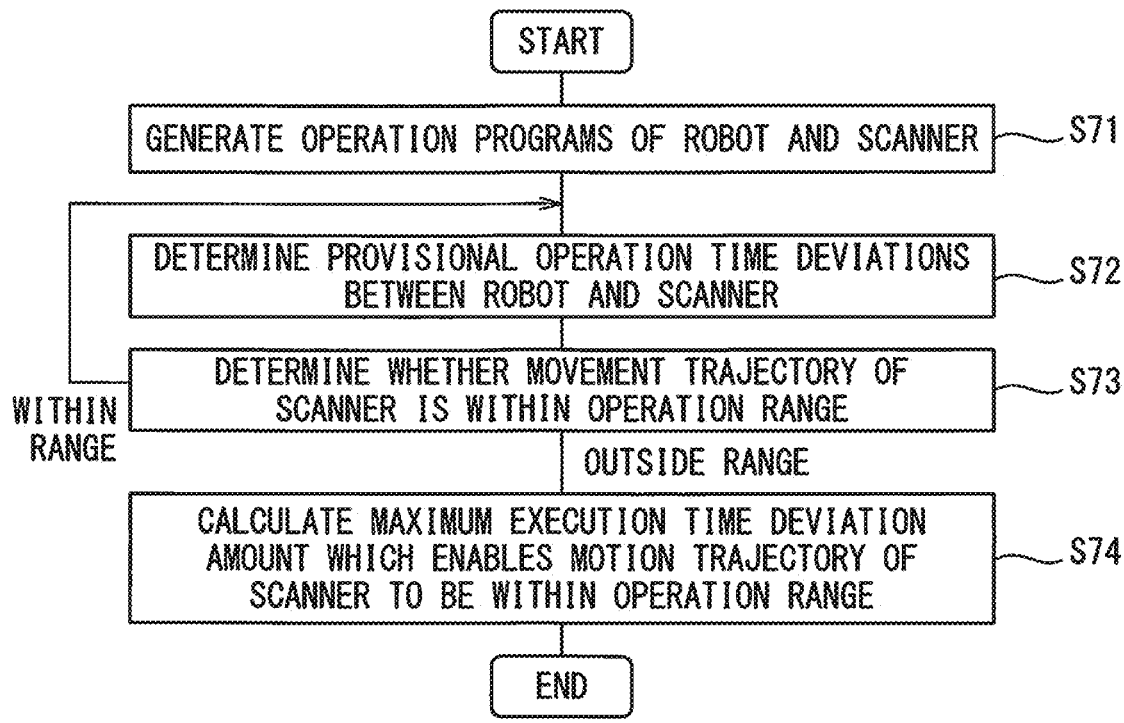

TEACHING DEVICE, TEACHING METHOD, AND STORAGE MEDIUM STORING TEACHING PROGRAM FOR LASER MACHINING

RELATED APPLICATIONS

The present application claims priority of Japanese Application Number 2018-163851, filed Aug. 31, 2018, the disclosure of which is hereby incorporated by reference herein in its entirety.

BACKGROUND OF THE INVENTION

1. Field of the Invention

The present invention relates to a teaching device for laser machining which performs teaching for a laser machining system using a robot, a teaching method, and a teaching program.

2. Description of Prior Art

Remote laser machining systems in which a Galvano scanner is mounted on the arm tip of a robot and which perform machining such as welding on workpieces are becoming popular (refer to Japanese Unexamined Patent Publication (Kokai) No. 2006-247677A).

SUMMARY OF THE INVENTION

In laser machining systems, conventionally, an operator determines a motion path of a robot instinctively based on positions of welding points, and determines the timing for welding each welding point along the motion path. Automatic setting of an optimum machining path to reduce machining operation time, i.e., cycle time, for all of the welding point groups to be machined and to improve weld quality in laser machining systems has been demanded.

An aspect of the present disclosure provides a teaching device for teaching a machining operation of a machining head which irradiates an object with laser light in a scanning manner and a movement operation of a robot which moves the machining head in a laser machining system, the teaching device comprising a data input unit which accepts input of positions of a plurality of machining points set on the object and a required machining time set for each of the machining points, a grouping unit which divides the plurality of machining points into a plurality of machining point groups each including two or more machining points so that the machining head, which moves in each of the plurality of machining point groups at a constant speed, can sequentially machine each of the two or more machining points for the machining time, and so that an in-group non-machining time, during which the two or more machining points are not machined, can be minimized, a machining path determination unit which determines, for each of the plurality of machining point groups, a machining path, on which the robot moves the machining head at a constant speed in each of the plurality of machining point groups, so that the shortest distances from the machining path to the two or more machining points are smaller than or equal to a scanning operation range of the machining head, and that an in-group movement time for completing machining of the two or more machining points is shortest, a teaching process adjustment unit which adjusts a machining order of the two or more machining points in each of the plurality of machining point groups and an operation order of the plurality of machining point groups, obtained as a result of processing of the grouping unit and the machining path determination unit, so as to minimize a distance between the machining point processed last in a machining point group and the machining point processed first in a subsequent machining point group, and which optimizes the grouping of the plurality of machining point groups so as to minimize a total movement time for completing machining of all of the plurality of machining points, and a teaching data output unit which outputs, as teaching data, machining execution positions on the machining path of each of the plurality of machining point groups obtained as a result of processing of the teaching process adjustment unit.

BRIEF DESCRIPTION OF DRAWINGS

The object, features, and advantages of the present invention will be made clear by the following description of the embodiments in relation to the attached drawings. In the attached drawings:

FIG. 16 is a flowchart showing the process for operating an operation program on an actual machine and measuring an execution time deviation amount, FIG. 17 is a flowchart showing the process for determining a maximum execution time deviation amount.

DETAILED DESCRIPTION

Figure 1:
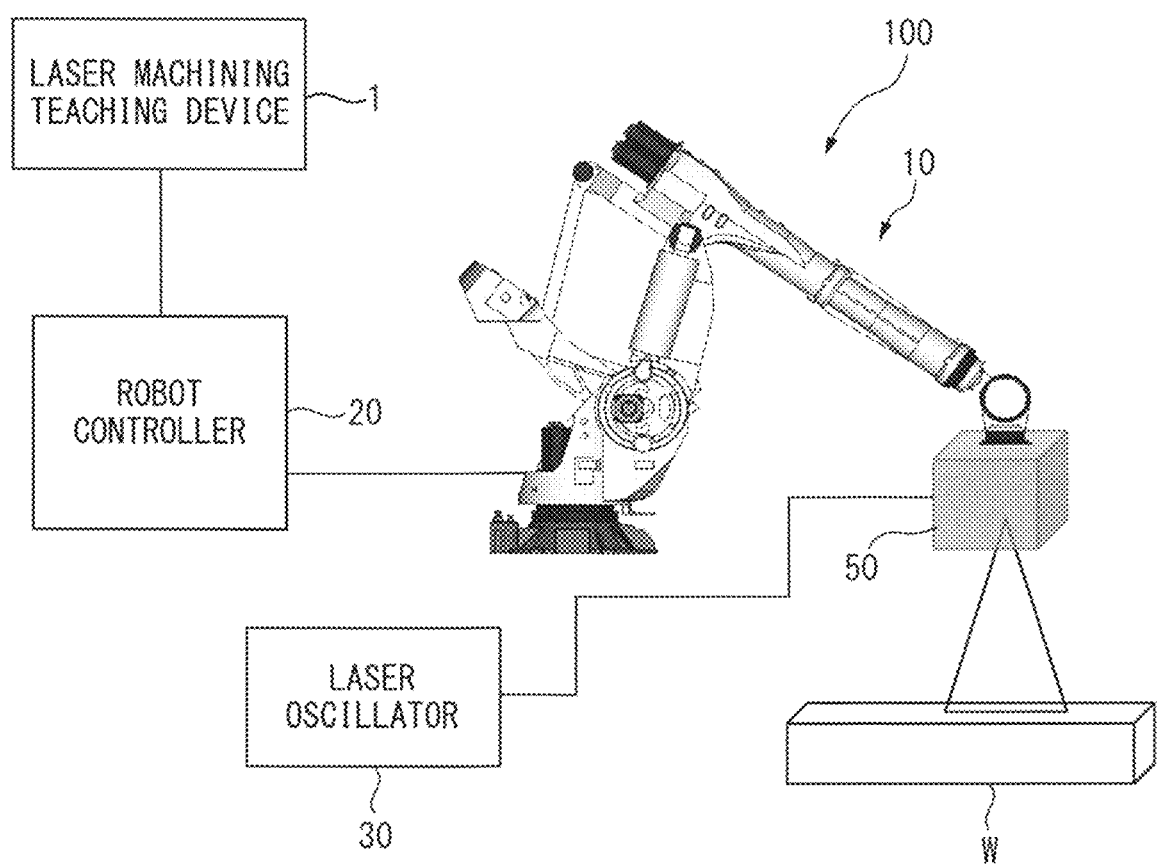
FIG. 1 is a view showing the overall structure of a laser machining system comprising a laser machining teaching device according to an embodiment.

The embodiments of the present invention will be described below with reference to the attached drawings. In the drawings, corresponding constituent elements have been assigned common reference numerals. For the ease of understanding, the scales of the drawings have been appropriately modified. Furthermore, the embodiments shown in the drawings are merely examples for carrying out the present invention. The present invention is not limited to the embodiments shown in the drawings.

FIG. 1 is a view showing the overall structure of a laser machining system 100 comprising a laser machining teaching device 1 according to an embodiment. The laser machining system 100 is constituted by a so-called cooperative remote laser machining system which performs machining on each of the machining points on a workpiece W by scanning with laser light while moving a Galvano scanner (hereinafter simply referred to as a scanner) 50 as a machining head mounted on the arm tip of a robot 10. In the structural example of FIG. 1, the laser machining system 100 comprises a robot 10, a robot controller 20 for controlling the robot 10, a laser oscillator 30, and the laser machining teaching device 1. Though the robot 10 is a vertical articulated robot in the structural example of FIG. 1, other types of robots may be used. Furthermore, laser scanning devices other than a Galvano scanner may be used. The scanner 50 has a function to scan laser light emitted from the laser oscillator 30 via an optical fiber in the XY directions by driving a mirror, and has a function to move a laser spot in the Z direction by driving a lens in the Z direction.

The laser machining teaching device 1 is a programming device which can generate operation programs for the robot 10 and the scanner 50 off-line. In the structural example shown in FIG. 1, the laser machining teaching device 1 is connected with the robot controller 20 via a network, and the operation program for the robot 10 produced by the laser machining teaching device 1 can be transmitted from the laser machining teaching device 1 to the robot controller 20 via the network. The robot 10 is operated in accordance with the operation program loaded into the robot controller 20. Furthermore, the laser machining teaching device 1 generates an operation program for the scanner 50. The robot controller 20 may be constituted by a conventional computer comprising a CPU, ROM, RAM, a storage device, etc. The operation program for the scanner 50 generated by the laser machining teaching device 1 is transmitted from the laser machining teaching device 1 to a control unit of the scanner 50 via the robot controller 20. The control unit of the scanner 50 can operate in accordance with the loaded operation program. The control unit of the scanner 50 may be constituted by a conventional computer comprising a CPU, ROM, RAM, a storage device, etc.

The laser machining system 100 can perform various types of laser machining such as welding and cutting. The laser machining system 100 will be described below as a system for performing welding. As described in detail below, the laser machining teaching device 1 produces an operation program which divides a welding target welding point group into appropriate groups, optimizes operation speed, and minimizes the time required for a series of welding operations (hereinafter also referred to as cycle time) for the welding point group. Note that the laser machining teaching device 1 may be constituted by a conventional PC comprising hardware components such as a CPU, ROM, RAM, a hard disk, an input device, a display device, and a network interface. Various types of information processing devices such as a desktop PC, notebook PC, or a portable information terminal can be used as the laser machining teaching device 1.

Figure 2:
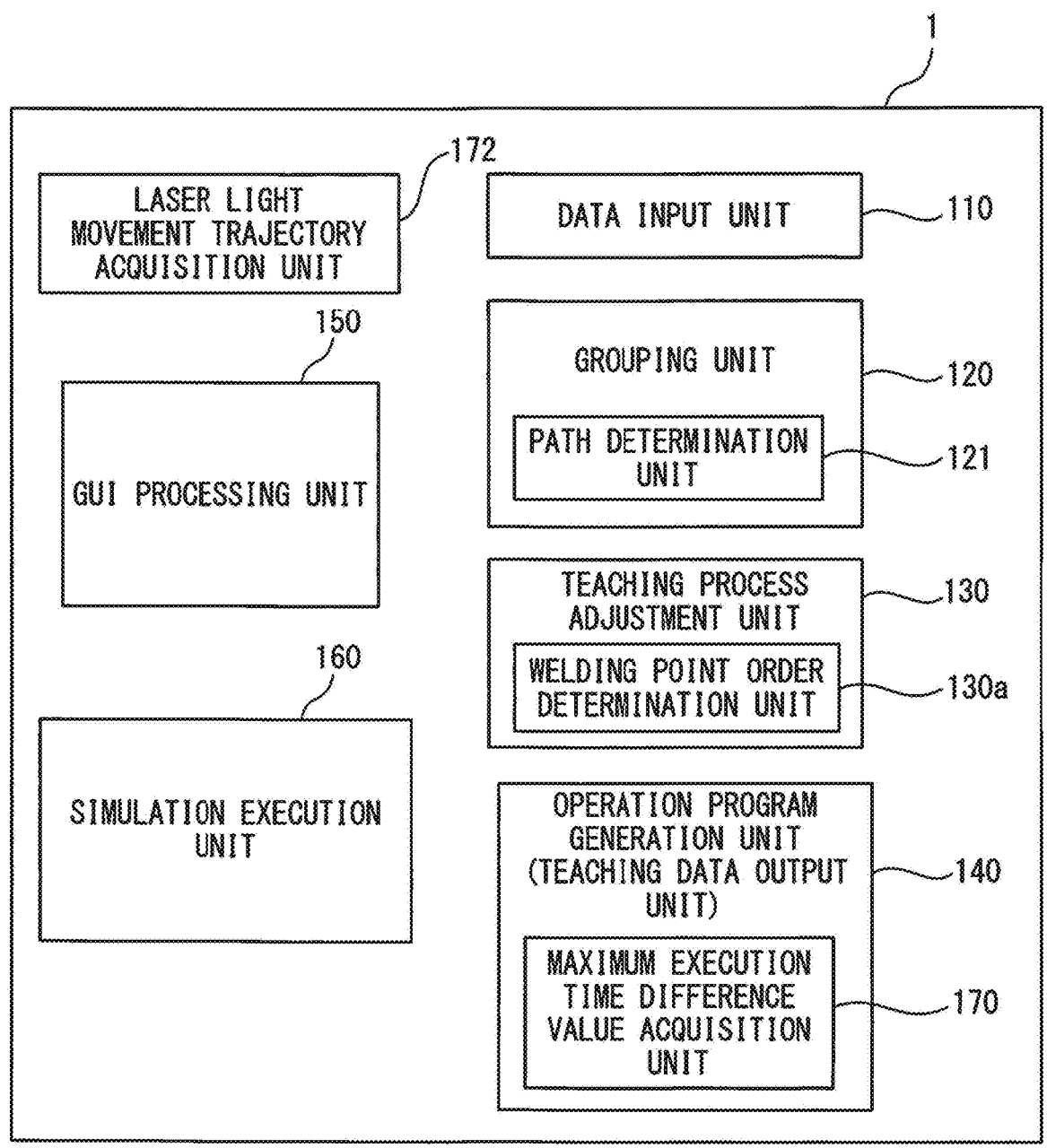
FIG. 2 is a view showing functional blocks constituting the laser machining teaching device.

FIG. 2 illustrates functional blocks constituting the laser machining teaching device 1. The functional blocks shown in FIG. 2 may be realized by the execution of software by the CPU of the laser machining teaching device 1, or may be realized by dedicated hardware such as an ASIC (application specific integrated circuit). As shown in FIG. 2, the laser machining teaching device 1 includes a data input unit 110, a grouping unit 120, a teaching process adjustment unit 130, an operation program generation unit 140, a graphical user interface (GUI) processing unit 150, a simulation execution unit 160, an maximum execution time difference value acquisition unit 170, and a laser light movement trajectory acquisition unit 172.

The data input unit 110 acquires various types of data necessary for the operation program generation process including the welding point group of the welding target, the welding time of each welding point, a welding pattern, and model data of the workpiece. Each of these types of data may be stored in a storage device of the laser machining teaching device 1 in advance, or may be input to the laser machining teaching device 1 via an operation unit. Alternatively, the various types of data may be input to the laser machining teaching device 1 from an external device via the network.

The grouping unit 120 performs grouping for the welding point group acquired by the data input unit 110, and optimizes the grouping and the welding point order in the group. The teaching process adjustment unit 130 determines an operation speed so as to minimize the cycle time in which all of the welding points of the welding target can be welded. The operation program generation unit 140 functions as a teaching data output unit which outputs teaching data of the robot 10 and the scanner 50 using the path determined by the grouping unit 120 and the operation speed determined by the teaching process adjustment unit 130, and functions to produce an operation program. The GUI processing unit 150 generates and displays a graphical user interface (GUI) for displaying information related to the operation program generation process and for performing setting input. The details of the GUI processing unit 150, the maximum execution time difference value acquisition unit 170, and the laser light movement trajectory acquisition unit 172 will be described later. The simulation execution unit 160 executes a simulation operation using the operation programs of the robot 10 and the scanner 50.

Figure 3:
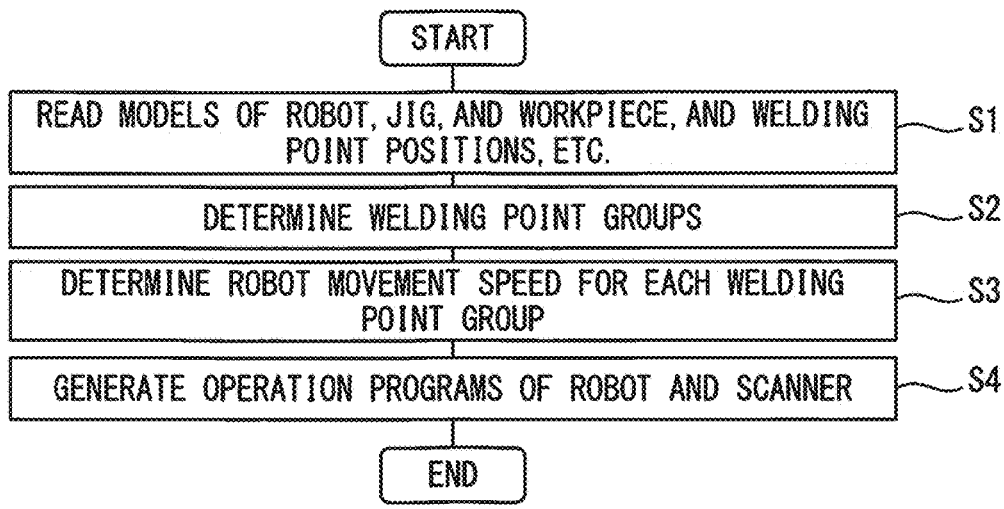
FIG. 3 is a view showing the main flow of an operation program generation process executed by the laser machining teaching device.

FIG. 3 illustrates the main flow of the operation program generation process executed by the laser machining teaching device 1. The operation program generation process is executed under the control of the CPU of the laser machining teaching device 1. In step S1, model data of the robot, jig, and workpiece W, the welding point positions of the welding point group of the welding target, and data on the welding time and welding pattern of each of the welding points are read by the data input unit 110.

Next, in step S2, a process for determining the welding point groups is performed by the grouping unit 110. Grouping is performed so as to satisfy the following criteria:

(1) the distance between the path of the robot passing through the welding point group and each welding point is within the operation range of the scanner (scanning range), and (2) when defining a line segment having a length corresponding to welding time along the path at the position of a foot of a perpendicular extended from each welding point to the robot path, the welding point groups are determined so that the degree of concentration along the path of the line segments corresponding to the welding times becomes uniform.

Figure 4:
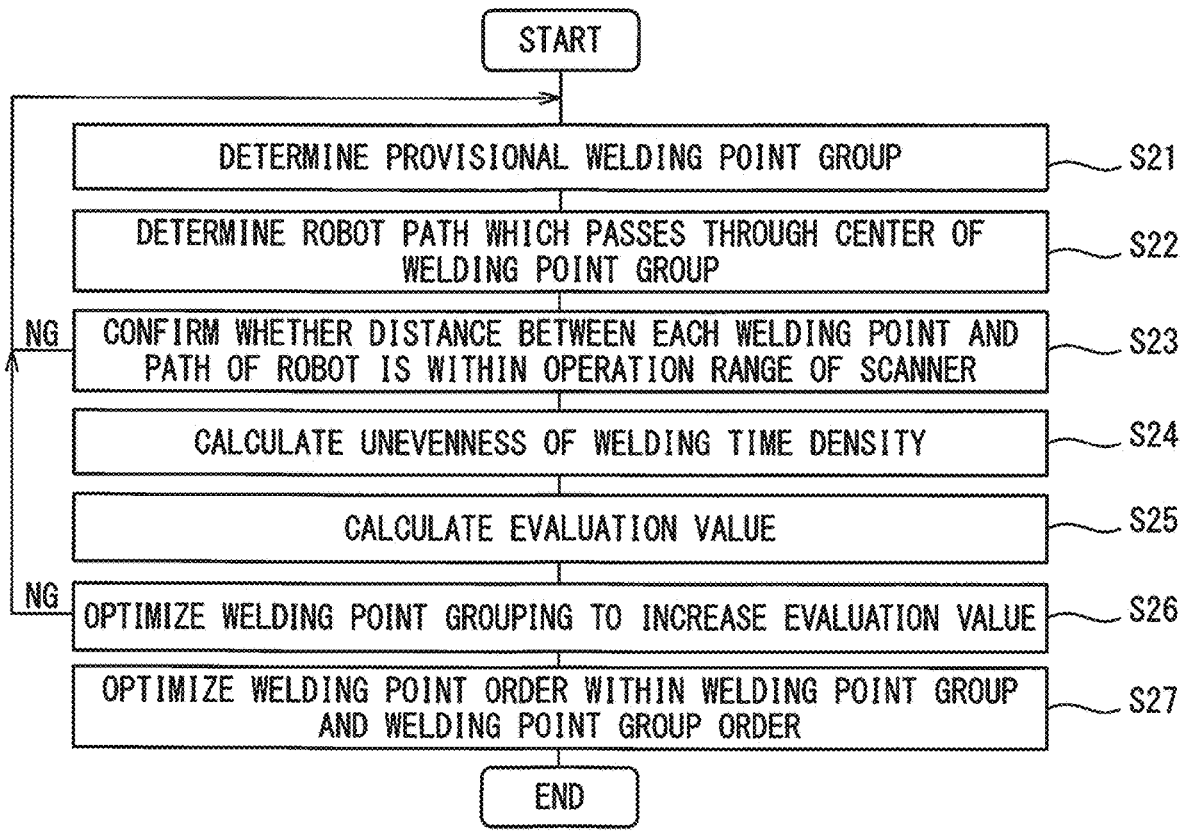
FIG. 4 is a flowchart showing the details of a welding point group determination process.
Figure 6:
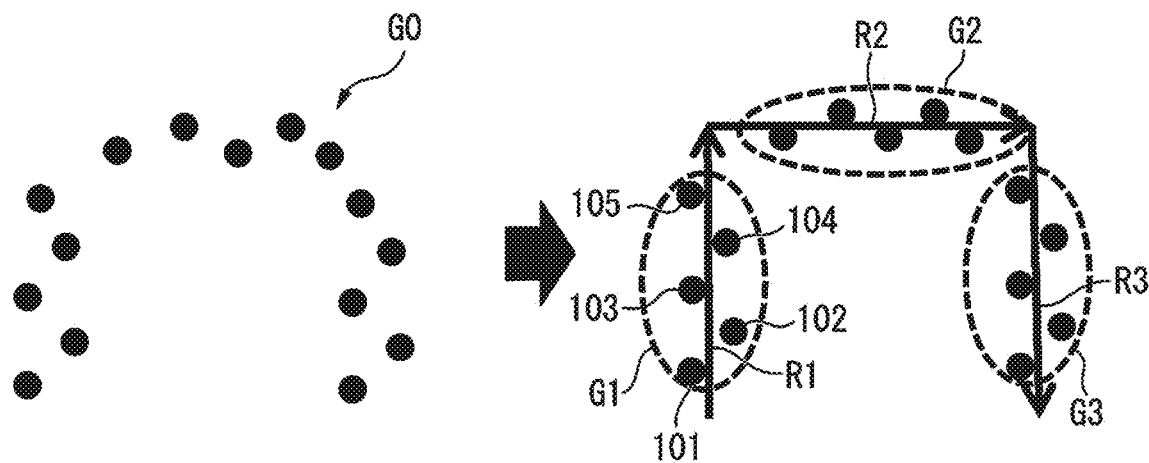
FIG. 6 is a view detailing the grouping of the welding point group.

FIG. 4 is a flowchart showing the details of the welding point group determination process performed in step S2. Below, grouping is performed on a welding point group G0 as shown on the left side of FIG. 6 as an example. First, in step S21, the welding point group G0 is grouped into provisional welding point groups. A single group defines a plurality of welding points on which welding is performed while the robot 10 is operated by a single operation command. In the single group, the robot 10 is operated by the single operation command, and while the scanner 50 performs a scanning operation, each welding point belonging to the group is welded. In the single operation command, the robot 10 operates linearly at a constant speed. The welding point group G0 is provisionally divided into three welding point groups G1 to G3, as shown on the right side of FIG. 6 as an example.

In step S22, a path of the robot 10 passing through the center of the welding point group is determined for each of groups G1 to G3. Path determination is performed by a path determination unit 121 as a function of the grouping unit 120. The path passing through the center of the welding point group is determined by, for example, the least squares method. Group G1 will be described as an example. A path R1 is determined as a straight line that minimizes the sum of the squares of the distances from respective welding points 101 to 105 to the path R1. Note that since the positions of the welding points are positions in three-dimensional space, though the welding points 101 to 105 are actually distributed in three-dimensional space, the above path can be determined by defining a plane passing through a position obtained by averaging the welding point positions, and assuming that each welding point exists at a position in the plane on which each welding point is projected. The plane passing through the averaged position of the welding point positions can be determined, for example, using the least squares method or using the Newell algorithm. The paths R1, R2, and R3 are determined as the paths of the welding point groups G1, G2, and G3 by the process of step S22. Note that the path may be determined as a path along which a foot of a perpendicular extended from the irradiation position of the laser light to the plane defining the welding point group moves on the plane.

Figure 7:
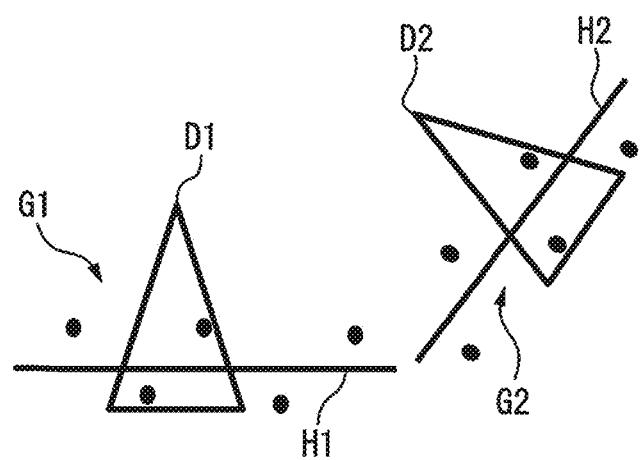
FIG. 7 is a view showing an example of a plane defining a welding point group.

The plane onto which the welding points of the welding point group are projected may be defined as a plane which is inclined with respect to the horizontal direction depending on the distribution of the welding points (the shape of the weld surface). For example, as shown in FIG. 7, the plane H1 defining the welding point group G1 is preferably defined as a plane which is inclined with respect to the plane H2 defining the welding point group G2. By determining the planes in this manner, it is possible to set the planes consistent with the distribution of the welding point groups. Note that FIG. 7 illustrates examples of the operational ranges of the scanner 50 set to the laser light irradiation positions D1, D2. The posture of the robot 10 is controlled so that the scanner 50 faces the plane H2 while the robot 10 is on the path corresponding to the welding point group G2.

Next, in step S23, it is confirmed for each of the welding point groups whether or not the welding points are within the operation range of the scanner 50. For example, regarding welding point group G1, it can be confirmed in step S23 whether or not the distance from each of the welding points 101 to 105 to the path R1 is within the operation range of the scanner 50. When the welding point outside the operation range of the scanner 50 is found (S23: No), grouping is performed again (step S21).

Figure 8:
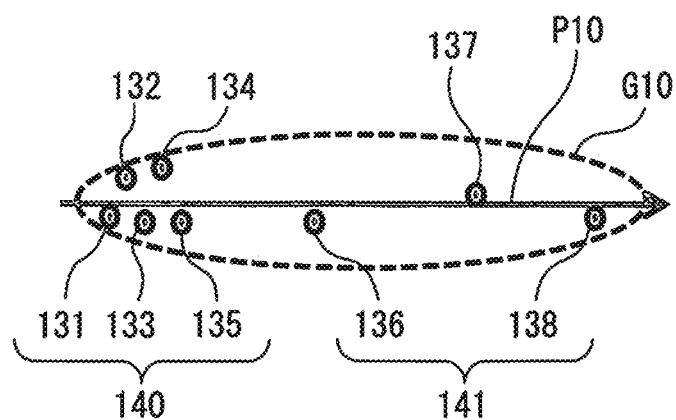
FIG. 8 is a view detailing grouping optimization.

Next, in the loop process of steps S24 to S26, grouping is optimized based on the distribution of the welding points and the welding time of each of the welding points in the welding point group. Grouping optimization will be described assuming a welding point group as shown in FIG. 8. In the example of FIG. 8, welding points 131 to 138 are distributed within a single welding point group G10. The path P10 is set in accordance with the process of step S22 for the welding point group G10. As described above, the robot operates at a constant speed in the operation corresponding to a single operation command. Thus, when the operation speed of the robot is set to a low speed so that welding of all of the welding points 131 to 135 in portion 140, in which the welding point density is high, can be completed by the robot, in portion 141, in which the welding point density is low, the robot will operate at an unnecessarily low speed. Thus, in this case, the average speed of the robot can be increased by dividing the welding point group G10 into a welding point group of portion 140 and a welding point group of portion 141. In other words, it is preferable to perform grouping so that the distribution of welding points within a single welding point group becomes uniform.

Figure 9:
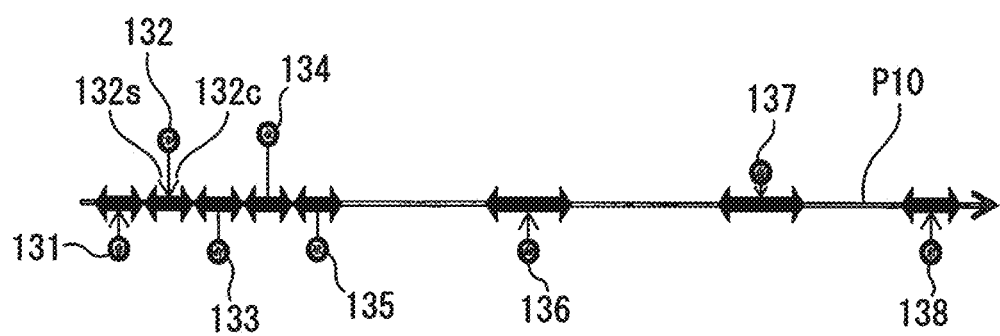
FIG. 9 is a view showing the degree of welding time density.

However, it is necessary to give some consideration to the fact that the welding time may differ among the welding points. As shown in FIG. 9, line segments having lengths corresponding to the welding times of the welding points are set on the path, centering at the position of the foot of a perpendicular extended from the welding point to the path. This line segment corresponds to the welding time of one welding point in the movement time of the robot along the path, and thus will be referred to below as welding time. For example, in FIG. 9, welding time 132$s$ centering at the position 132$c$ of the foot of the perpendicular extending from the welding point 132 to the path P10 is set. Note that for the sake of convenience, each welding time is represented by a thick double arrow line in FIG. 9.

Figure 10:
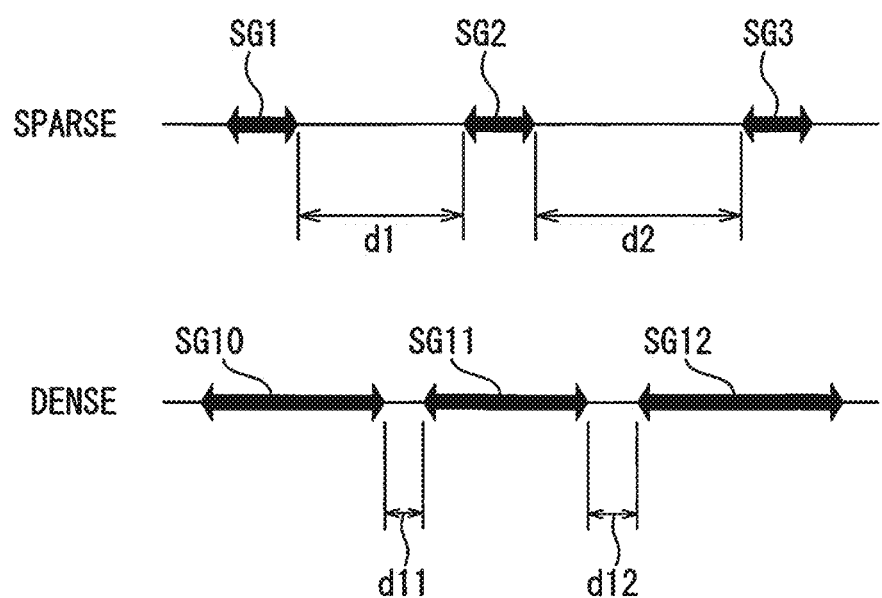
FIG. 10 is a view detailing the degree of welding time density.

In step S24, the welding time density (the degree of density of welding times) occupying the path is calculated. In this case, the welding time density can be expressed as the degree of concentration of welding times. For example, as shown in the upper portion of FIG. 10, the state in which the intervals d1 and d2 between welding times SG1, SG2 and SG3 set on the path are wide corresponds to a low welding time density (sparse state). In contrast thereto, as shown in the lower portion of FIG. 10, the state in which the intervals d11 and d12 between welding times SG10, SG11, and SG12 are narrow corresponds to a high welding time density (dense state). The state in which the intervals between adjacent welding times are wide indicates that the speed of the robot in the portions of the path corresponding to such welding times can be increased. Conversely, the state in which the intervals between adjacent welding times are narrow indicates that the speed of the robot in the portions of the path corresponding to such welding times cannot be increased. Thus, by evaluating the unevenness of the welding time density (density state unevenness) set on the path of a certain welding point group, regrouping when the density unevenness is high, and reducing the unevenness in the welding time density of each welding point group, the speed of the whole welding operation can be increased.

Thus, in step S24, a value representing unevenness of the density regarding the intervals between the welding times set on the path of a certain welding point group is calculated. For example, the unevenness of the welding time density may be obtained by determining the welding time density for each of short sections each having a fixed length on the path and by calculating the unevenness of the welding time density based on the variations of the determined welding time density. In step S25, an evaluation value is calculated such that a smaller density unevenness gives a higher score.

In step S26, it is determined whether or not the evaluation value of each welding point group is equal to or greater than a predetermined threshold value. When there is a group having an evaluation value which is less than the predetermined threshold value (S26: NG), grouping is performed again so that the evaluation value of the group becomes high, and the processes from step S22 are repeated. Conversely, when the evaluation values of all of the welding point groups are equal to or greater than the threshold value, the process of step S27 is performed. Optimization of the welding point grouping can be carried out by such a loop process. Note that in such loop process for optimization, for example, a genetic algorithm may be used.

Figure 11:
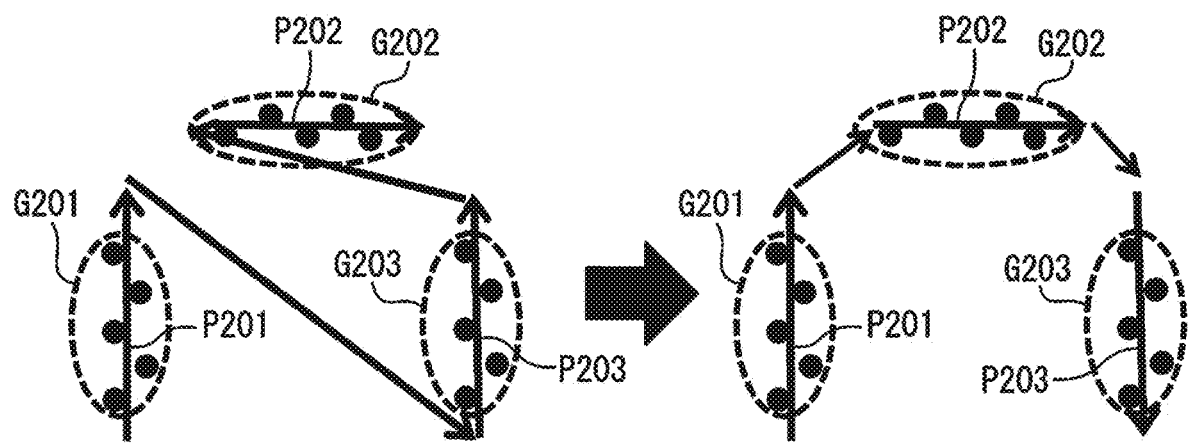
FIG. 11 is a view detailing optimization of a movement order between groups.

Next, in step S27, optimization of the movement order between welding point groups and the welding point order within the welding point group is performed. It is assumed that the grouping and path as shown on the left side of FIG. 11 have been determined by the process up to step S26. In the example of the left side of FIG. 11, the welding point group of the welding target are grouped into three welding point groups G201 to G203, and paths P201 to P203 are set for the groups. In step S27, the movement direction of the paths set for the welding point groups and the movement order between the welding point groups are optimized. In FIG. 11, the left side represents a state prior to optimization, and the right side represents a state after optimization. In the state prior to optimization, the order between the groups is set to the order of group G201, then group G203, and finally group G202. Furthermore, the welding point order from the bottom of the image toward the top is determined for group G201, the welding point order from the bottom of the image toward the top is determined for welding point group G203, and the welding point order from the left of the image toward the right is determined for welding point group G202. It can be understood that the state prior to optimization has a long total movement distance between the groups, and there is room for improvement.

In the state after optimization on the right side of FIG. 11, the movement order between the groups is set to the order of the welding point group G201, then welding point group G202, and finally welding point group G203. Furthermore, the welding point order from the bottom toward the top is determined for the welding point group G201, the welding point order from the left toward the right is determined for welding point group G202, and the welding point order from the top toward the bottom is determined for the welding point group G203. It can be understood that in the state after optimization, the total movement distance between the welding point groups is minimized. Various methods which are known in the art for solving the so-called "travelling salesman problem" can be used as the method for determining the movement order for minimizing the total movement distance between welding point groups. The welding point group determination process (step S2) of the main flow of FIG. 3 can be completed by the above process.

Figure 5:
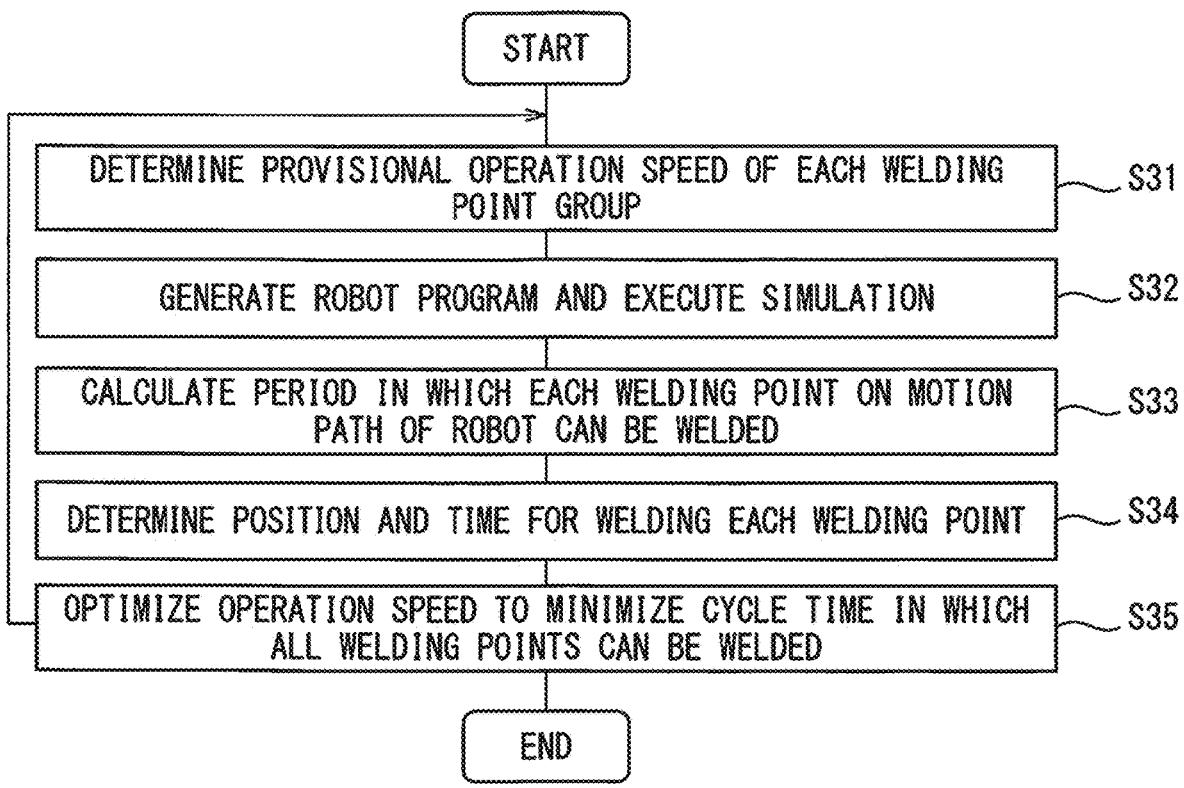
FIG. 5 is a flowchart showing the details of an operation speed determination process.

Next, in main flow step S3, the operation speed of the robot is determined for each welding point group. FIG. 5 is a flowchart showing the details of this operation speed determination process. This process is executed by the teaching process adjustment unit 130. First, in step S31, a provisional robot speed is set for each welding point group. The provisional speed may be set uniformly for all of the welding point groups to a low speed at which welding of all of the welding points of each welding point group is considered possible without problems. Alternatively, a representative speed based on experience values may be uniformly set for each welding point group.

Next, in step S32, an operation program of the robot 10 is generated using the robot path determined in step S2 of the main flow and the operation speeds of the welding point groups determined in step S31, and a robot operation simulation is executed. Position data (hereinafter also referred to as "motion path") for each interpolation cycle of the robot is acquired from the execution of the operation simulation.

Figure 12:
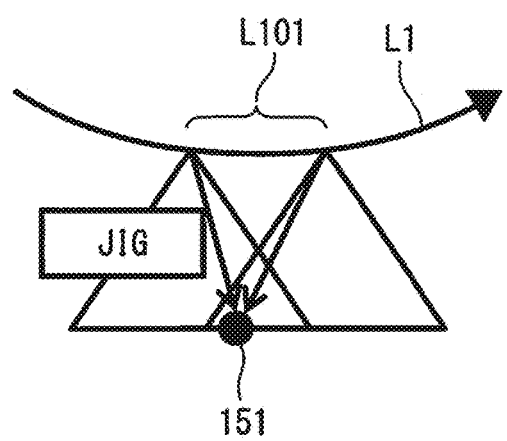
FIG. 12 is a view detailing determination of a weldable period.

Next, in step S33, using the motion path of the robot obtained from the robot operation simulation, a period (hereinafter referred to as a "weldable period") corresponding to a range in which each welding point can be welded on the motion path of the robot is calculated. This process will be described by discussing, as an example, the case where the weldable period in which welding point 151 can be welded is determined regarding the operation path L1 of the robot, as shown in FIG. 12. First, the position of the scanner (specifically, for example, the position of the condenser lens of the scanner) attached to the arm tip of the robot is determined based on the position of the robot on the motion path L1, and a laser light path which connects the position of the scanner 50 and the position of the welding point 151 is determined. At this time, when the following conditions are satisfied, it is determined that welding can be carried out for such a laser light path:

(1) the path of the laser light does not interfere with the workpiece or jig;

(2) the path of the laser light is within the operation range of the scanner; and (3) the irradiation angle, which is the angle between the normal direction on the workpiece at the welding point position and the laser light, is within a predetermined tolerance.

Note that condition (3) above is used to prevent the occurrence of unevenness in the irradiation intensity of the laser light for the workpiece and to maintain weld quality. The period corresponding to the range in which the laser light path is determined to be weldable in succession on the motion path is the weldable period for each welding point determined in step S33. In the example of FIG. 12, reference sign L101 represents the weldable period. Note that, in some cases, weldable periods may be determined at multiple locations on the motion path. Since it is necessary that the weldable period be equal to or greater than the welding time of the target welding point, weldable periods which do not satisfy this condition are discarded.

Next, in step S34, the positions and times for welding the welding points are determined using the weldable periods of the welding points determined in step S33. In consideration of the welding time of each welding point as a first condition, the times for welding are determined to ensure that the welding time of each welding point is satisfied without depending on the order of the start times of the weldable periods of the welding points. For example, the case in which there are two welding points A, B having identical welding times of one second, the weldable period of welding point A is from 1 second to 4 seconds from operation start, and the weldable period of the welding point B is from 1.1 seconds to 2.1 seconds from operation start will be assumed. In this case, though welding point A can be welded earlier, if welding point A is welded from 1 second to 2 seconds, welding point B cannot be welded. In such a case, in the present step, welding point B is welded from 1.1 seconds to 2.1 seconds, and welding point A is welded from 2.1 seconds to 3.1 seconds.

Figure 13:
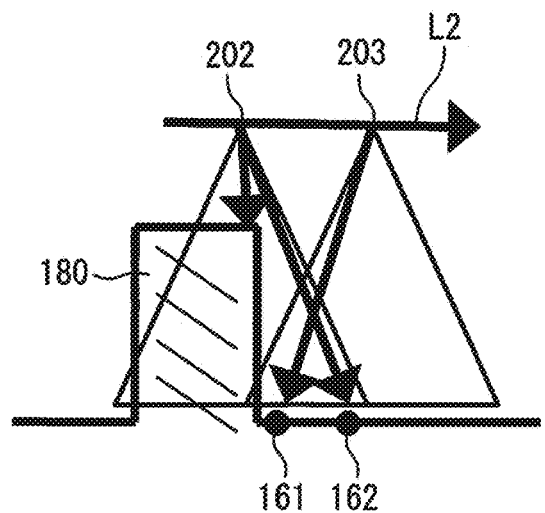
FIG. 13 is a view detailing determination of welding point order.

Furthermore, in step S34, as a second condition, if there is a welding point that can be welded earlier due to the positional relationship between the motion path and the workpiece or jig without depending on the arrangement order of welding points, such welding point is welded preferentially. For example, as shown in FIG. 13, though the arrangement order of welding points along the motion path L2 is in the order of welding points 161 and 162, in the case in which the welding point 161 is obscured behind a protrusion 180 of the workpiece and the welding point 162 becomes weldable first when viewed from the motion path L2 toward the welding point, welding of the welding point 162 at the position 202 on the motion path is first performed, and thereafter welding of welding point 161 is performed at the position 203 behind the position 202. The process of step S34 is executed by a welding point order determination unit 130a as a function of the teaching process adjustment unit 130.

Next, in step S35, the operation speed is adjusted and optimized so that all of the welding points can be welded and the cycle time is reduced. For example, lowering the operation speed until it becomes possible to weld all of the welding points at the same operation speed of the robot 10 for all welding point groups, and thereafter increasing the operation speed for each welding point group can be considered. As a result of the above process, the operation speed determination process (step S3) of the main flow of FIG. 3 ends.

Next, operation programs for the robot 10 and the scanner 50 are produced using the results obtained in accordance with the above process from step S1 to S3. The operation program of the robot 10 is produced so that the robot 10 moves along the path set for each welding point group by the process of step S2 at the operation speed determined in step S3. The operation program of the scanner 50 is produced as a motion command group which regulates the position and posture of the scanner 50 so that when the robot 10 moves on the motion path in accordance with the operation program, the welding points are irradiated with laser light during the welding time set for each of the welding points.

According to the configuration described above, a suitable motion path of the robot, and the timing for welding each of the welding points can be automatically determined.

In the laser machining system 100 described above, the robot 10 and the scanner 50 are controlled by separate controllers. Problems to be considered when the robot 10 and the scanner 50 are controlled by separate controllers in this manner will be described.

Since the operation program of the robot 10 and the operation program of the scanner 50 begin simultaneously in accordance with a start signal, it is necessary to operate according to the cycle time assumed at the time of generation thereof.

However, when the robot and the scanner are operated by separate controllers, in general, both do not operate according to the cycle time assumed at the time of program generation. This is caused by differences in mechanical conditions between the robot and the scanner. When such a desynchronization occurs, since the robot is not located at the position assumed when the program was produced as the scanner 50 welds a certain welding point, the welding point position may be outside of the operation range of the scanner, or alternatively, the jig or workpiece may interfere with the laser light. This is due to the fact that the operation program of the scanner 50 is produced so as to perform welding, toward the welding point, from the position of the scanner 50 determined based on the position to which the robot 10 has moved according to the operation program of the robot 10 at the timing for welding.

Figure 14A:
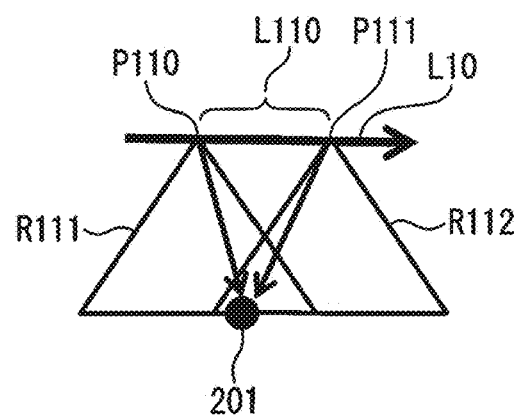
FIG. 14A is a view detailing issues due to operation program execution time deviation between robot and scanner.

An example of problems due to such desynchronization will be described with reference to FIGS. 14A and 14B. FIG. 14A shows a situation in which the operation program of the robot 10 and the operation program of the scanner 50 both operate in synchronization (at the expected cycle timing). In FIG. 14A, a range R111 represents the operation range of the scanner 50 at the start time point P110 of the welding period L110, and a range R112 represents the operation range of the scanner 50 at the end time point P111 of the welding period L111. Thus, it can be understood that welding of the welding point 201 can be appropriately performed within the operation range of the scanner 50 along the motion path L10 during the welding period L110.

Figure 14B:
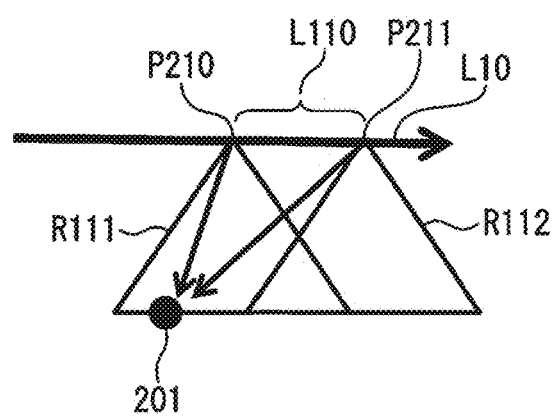
FIG. 14B is a view detailing issues due to operation program execution time deviation between the robot and scanner.

Conversely, FIG. 14B shows a situation in which the operation of the scanner 50 is behind the expected cycle time. Since the operation of the scanner 50 is behind, the scanner 50 operates to emit laser light toward the welding point 201 within a range from the position P210 to the position P211. In this case, though the welding point 201 is included in the operation range R111 at the position P210, at the position 211, the welding point 201 is outside of the operation range R112 of the scanner 50. When a welding point is outside of the operation range of the scanner 50, the laser machining system 100 performs an emergency stop.

In order to solve this problem, in general, it is necessary to execute the operation program of the robot 10 and the operation program of the scanner 50 on an actual machine to acquire an execution time deviation amount therebetween. For example, the case in which the operation program of the robot 10 operates in 10 seconds and the operation program of the scanner 50 operates in 11 seconds when the operation program of the robot 10 and the operation program of the scanner 50, which were produced so that the cycle times thereof are ten seconds, are executed on an actual machine will be assumed. In this case, the operation program of the robot 10 is produced so as to operate in 11 seconds, to correct the deviation time of 1 second, and the operation program of the scanner 50 is produced so as to operate in 10 seconds. As a result, the robot 10 and the scanner 50 operate at the same cycle time of 11 seconds.

In order to acquire the deviation amount of the execution times of the operation programs of the robot 10 and the scanner 50 in this manner, it is necessary to operate the operation programs on an actual machine. However, if the welding point is outside of the operation range of the scanner 50 during operation, as described with reference to FIGS. 14A and 14B, and the laser machining system 100 performs an emergency stop, the operation program cannot be executed until the end, whereby the deviation amount of the execution time cannot be acquired. In this case, a provisional deviation amount of the execution time is assumed, and the operation programs of the robot 10 and the scanner 50 are produced so as to correct this deviation amount. However, if the assumed deviation amount is not appropriate, it will become necessary to repeat the operation on the actual machine while correcting the deviation amount many times.

Figure 15A:
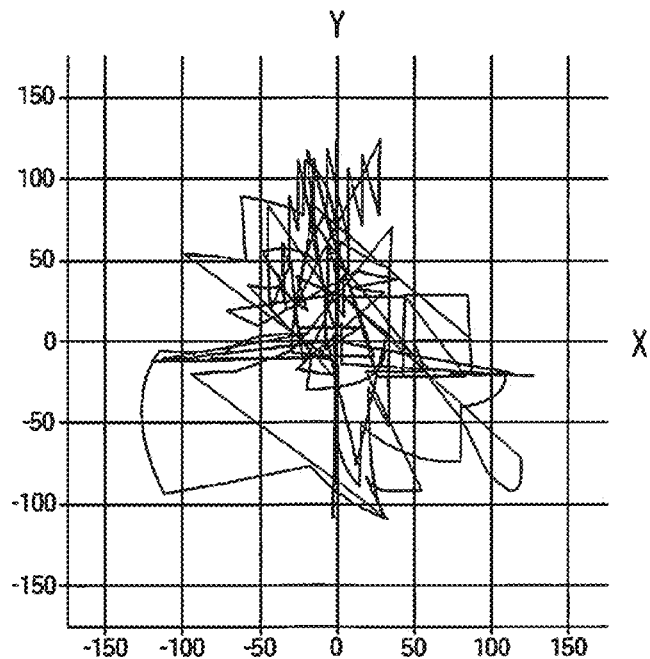
FIG. 15A is a graph representing scanner movement trajectory.

Thus, an appropriate deviation amount is determined in the following manner. FIG. 15A is a graph showing the movement trajectory of laser light in the XY directions as viewed from the scanner 50, and shows the case in which the deviation amount between the operation programs of the robot 10 and the scanner 50 is not set. Acquisition of the movement trajectory is executed by the laser light movement trajectory acquisition unit 172. Such a graph can be calculated from the position of the robot at a certain time when the operation program of the robot 10 is executed and the position of the welding point for which the scanner 50 performs welding at the certain time. A range from −150 mm to +150 mm in the XY directions is set as the operation range of the scanner 50. As shown in FIG. 15A, in a state in which desynchronization has not occurred, the movement trajectory of the scanner 50 is within the operation range of the scanner 50.

Figure 15B:
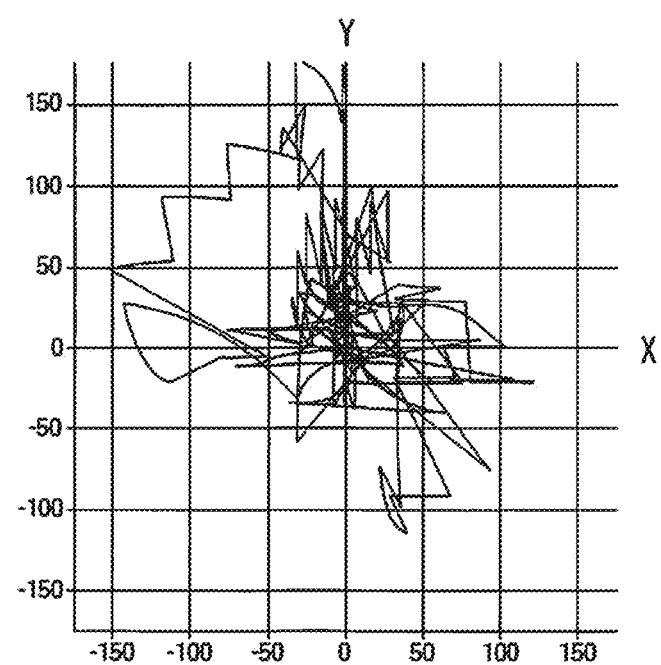
FIG. 15B is a graph representing scanner movement trajectory.

The movement trajectory of the scanner 50 when a deviation amount is assumed can also be calculated. For example, when it is assumed that the operation program of the scanner 50 generated so as to operate in 10 seconds actually operates in 11 seconds, the movement trajectory can be calculated by calculating the position of the scanner 50 at an $n \times {}^{10}/_{11}{}^{th}$ second, with respect to the position of the robot at an $n^{th}$ second, and assuming that the welding point of the welding target is irradiated with laser light from the position of the scanner 50. By confirming that the calculated and graphed movement trajectory of the scanner 50 is within the operation range of the scanner while increasing the assumed deviation amount, the maximum execution time deviation amount in which the movement trajectory of the scanner 50 does not exceed the operation range can be calculated. FIG. 15B shows a graph of the case in which the movement trajectory of the scanner 50 exceeds the operation range as a result of an increase in deviation amount.

When the deviation amount of the actual execution time on an actual machine is large, though it is preferable to increase the deviation amount used for correcting the operation program, if the deviation amount used to correct the operation program is increased excessively, in actual use, a situation in which the operation range of the scanner 50 is exceeded may occur despite the fact that the deviation amount does not actually occur on an actual machine. To prevent this, the deviation amount for the maximum execution time obtained as described above is set, and the operation programs are again generated so as to correct the deviation amount. As a result, it becomes possible to measure an accurate operation time deviation amount by executing the operation programs on an actual machine to the end. The operation program is produced again so as to correct the sum of the maximum execution time deviation amount described above and the deviation amount measured by executing the operation programs produced again on an actual machine so as to correct the maximum execution time deviation amount. As a result, operation programs for the robot 10 and scanner 50 for operating in synchronization can be obtained.

FIG. 16 shows, as a flowchart, a process for measuring an execution time deviation amount by operating operation programs on an actual machine. First, the operation programs of the robot 10 and the scanner 50 are produced by the operation program generation process of FIG. 3 (step S61). Next, the operation programs of the robot 10 and the scanner 50 are operated on an actual machine (step S62). At this time, the execution time deviation amount of the robot 10 and the scanner 50 is measured (step S63). The deviation amount may be measured by, for example, recording the operations of the robot 10 and scanner 50 as images. When the deviation amount has been acquired, the operation programs of the robot 10 and the scanner 50 are produced again so as to correct the deviation amount (step S64).

FIG. 17 illustrates, as a flowchart, a process for determining the maximum execution time deviation amount described above. The process of FIG. 17 is executed by the maximum execution time difference value acquisition unit 170 of the laser machining teaching device 1. First, the operation programs of the robot 10 and the scanner 50 are produced by the operation program generation process of FIG. 3 (step S71). Next, the execution time deviation amount between the robot 10 and the scanner 50 is determined (step S72), the movement trajectory of the scanner 50 at the deviation amount is determined, and it is determined whether or not the movement trajectory is within the operation range of the scanner (step S73). When the movement trajectory of the scanner 50 is within the operation range, the processes from step S72 are repeated. In step S72, the execution time deviation amount is set to a small value, and each time the loop process is repeated, the deviation amount is gradually increased. When the movement trajectory of the scanner 50 exceeds the operation range, the process proceeds to step S74, and the maximum execution time deviation amount when the movement trajectory of the scanner 50 is within the operation range is calculated. Note that the judgment of step S73 can be executed by the maximum execution time difference value acquisition unit 170 by automatically determining whether each point on the graph shown in FIG. 15A is within the operation range. When such a suitable correction value has been obtained, the operation programs of the robot 10 and the scanner 50 are produced so as to correct this correction value, and the processes from step S62 of FIG. 16 are executed, whereby operation programs of the robot 10 and scanner 50 compensating for the correction can be obtained.

Figure 18:
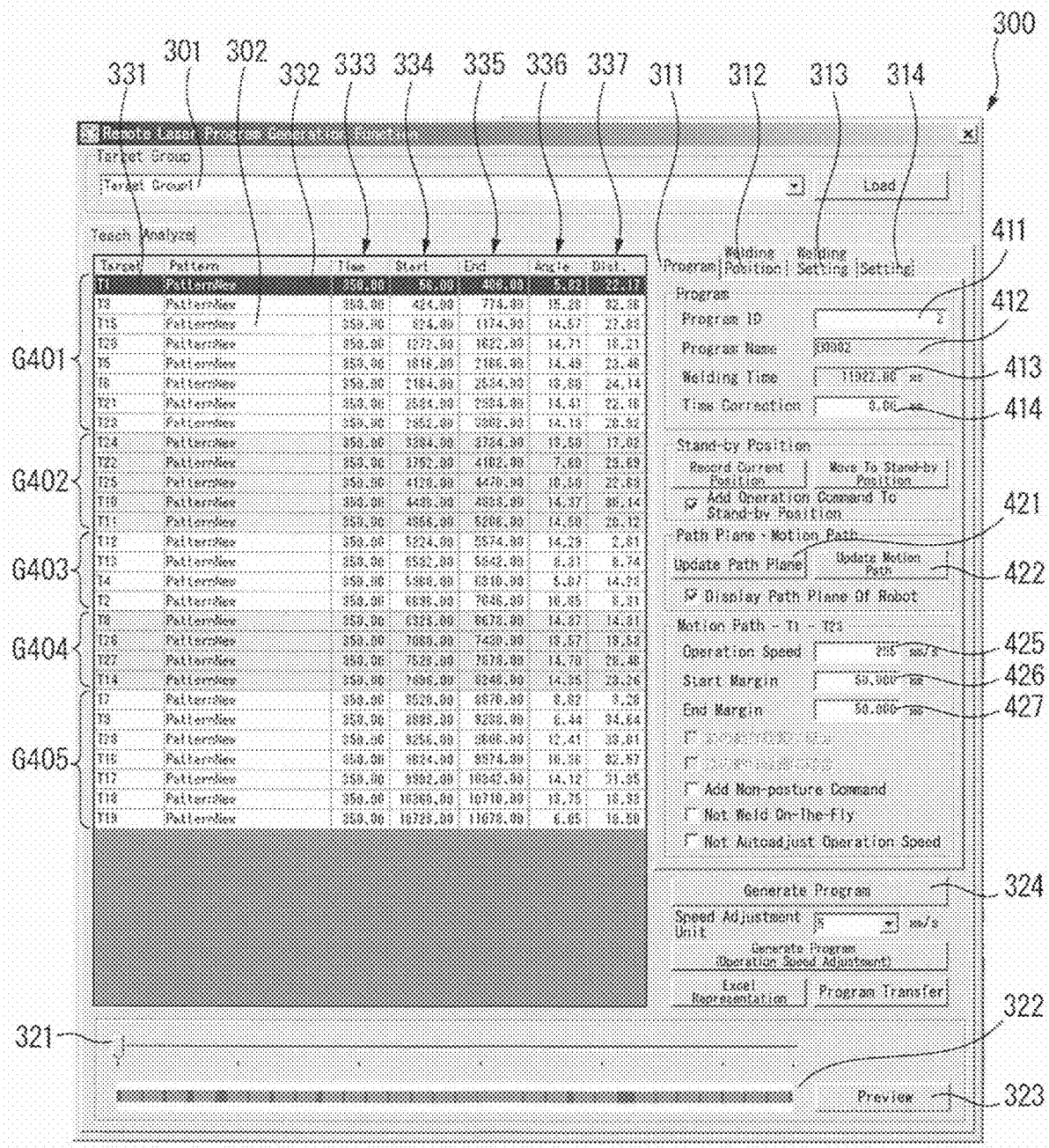
FIG. 18 is a view showing an example of a GUI displayed on a display screen of the laser machining teaching device.

Next, a graphical user interface (GUI) which is displayed on the screen of a display unit of the laser machining teaching device 1 as the processes shown in FIGS. 3 to 5 are executed will be described. FIG. 18 shows a GUI 300 displayed on a display device of the laser machining teaching device 1 by the GUI processing unit 150. The GUI 300 displays information related to the results of the operation program generation process and enables an operator to designate various conditions of the operation program generation process.

As shown in FIG. 18, the GUI 300 includes a welding point group designation field 301 for designating a welding point group of the welding target, a welding point list box 302 for displaying a list of the welding point group designated in the welding point group designation field 301, four tabs 311 to 314 for designating the types of setting, a slider 321, a color bar (a band-like region) 322, a preview button 323, and a program generation button 324 for designating the production of the operation programs. In the example of FIG. 18, the tab 311 is selected, and adjustment menus of the tab 311 is displayed on the right side of the GUI 300.

In the GUI 300, the welding point group designated in the welding point designation field 301 includes 28 welding points (T1 to T28). The welding point list box 302 displays the welding points from the top of the screen in the welding point order determined by executing the operation program generation process shown in FIGS. 3 to 5 for the designated welding point group. Furthermore, the welding point list box 302 includes fields 331 to 337 displaying the welding point number, welding pattern, welding time, welding start time, welding end time, laser light irradiation angle, and the distance between the path and the welding point, respectively, for each of the welding points. The welding pattern (field 332) represents the laser light irradiation pattern when a welding point is welded. The laser light irradiation angle represents the angle between the normal direction of the welding point and the laser light. Information on the welding start time, welding end time, laser light irradiation angle, and the distance between the path and the welding point (fields 333 to 337) is information which is acquired and displayed as a result of the program generation button 324 being pressed and the operation program generation process shown in FIGS. 3 to 5 being executed for the welding point group designated on the GUI 300. For example, the welding point ("T1") in the welding point group which is initially welded has a welding time of 350.00 ms, a welding start time of 56.00 ms, a welding end time of 424.00 ms, a laser light irradiation angle of 5.02°, and a distance between the path and the welding point of 22.17 mm.

Furthermore, in order to facilitate recognition of the grouping of the welding points in the welding point list, the fields of welding points of the same group are displayed in the same color, and at least adjacent welding point groups are displayed having different background colors. In the welding point list example of FIG. 18, the designated welding point group is grouped into five welding point groups G401 to G405.

Figure 19:
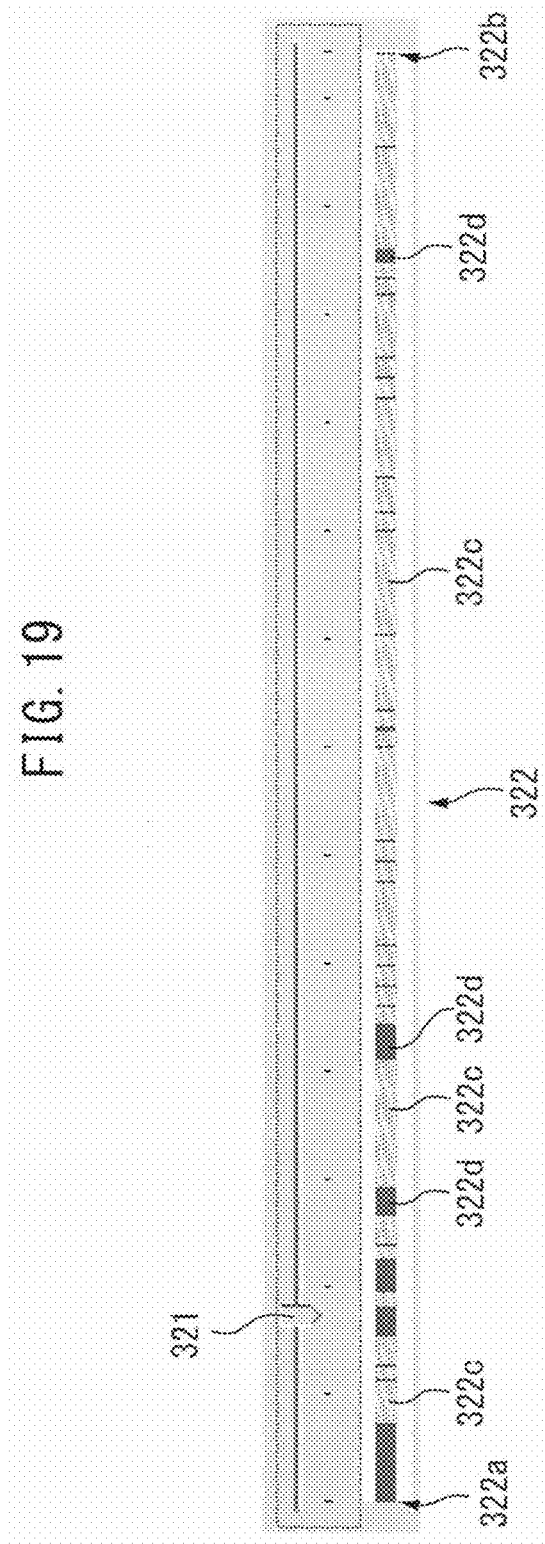
FIG. 19 is a view showing a display example of a color bar.

FIG. 19 shows an enlarged example of the color bar 322. As shown in FIG. 19, the color bar 322 is a bar graph where, by using the results obtained by performing the operation program generation process for the designated welding point group, the welding periods (machining periods) (when laser light is irradiated) and the non-welding periods (non-machining periods) (when laser light is not irradiated) in the welding operation process for the designated welding point group are displayed in two different colors in time series so as to facilitate distinguishing therebetween. The left end part 332a of the color bar 322 in the drawing corresponds to the start time of the operation program of the robot 10, and the right end part 322b of the color bar 322 in the drawing corresponds to the end time of the operation program of the robot 10. The portions displayed in the first color 322c in the color bar 322 represent the welding periods during which welding is performed, and the portions displayed in the second color 322d in the color bar 322 represent the non-welding periods during which welding is not performed.

An increase in the number of portions represented by the first color 322c in the color bar 322 indicates that the time during which welding is performed in the operation of the robot 10 is high, i.e., that the efficiency of the welding operation is high. Conversely, an increase in the number of portions represented by the second color 322d in the color bar 322 indicates that the time during which welding is performed in the operation of the robot 10 is small, i.e., that the efficiency of the welding operation is low. Thus, an operator can instantly visually understand, from the color bar 322, the efficiency of the welding operation in accordance with the currently used operation program (i.e., the current machining path). In the case in which the efficiency of the welding operation is considered low, the conditions can be changed and the operation program can be produced again.

Figure 20:
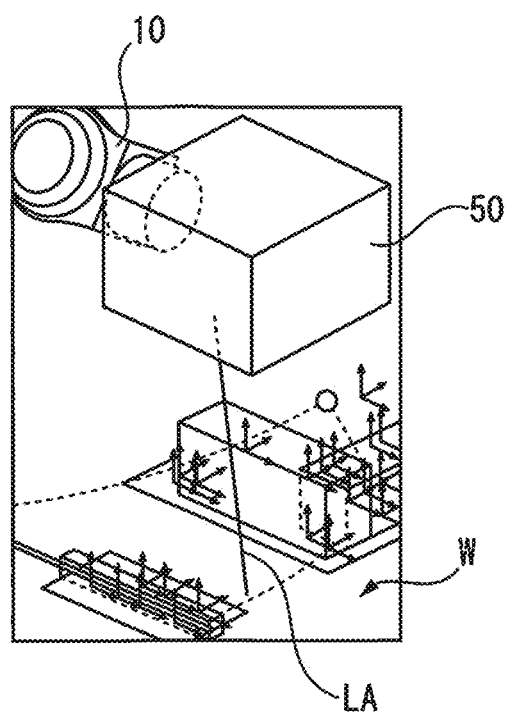
FIG. 20 is a view showing an example of a simulation screen associated with a slider.

The slider 321 is used to designate a time in a simulation operation of 3D models of the robot and the scanner executed using the operation program. Using the simulation operation results, the simulation execution unit 160 displays, on the screen, the 3D models of the robot 10 and the scanner 50 to take postures defined at the time designated by the slider 321 in the simulation operation. At this time, the path of the laser light leading to the welding point from the scanner 50 is displayed in the first color when welding is carried out and is displayed in the second color when welding is not carried out. Since the horizontal position of the slider 321 corresponds to the position on the horizontal axis of the color bar 322, the operator can search for the period (a portion in the second color) of the non-welding period on the color bar 322 and slide the slider 321 to the searched position, whereby the state of the robot 10 and the scanner 50 at the searched position can be intuitively confirmed on the screen. FIG. 20 shows an example of such a screen. In the screen example of FIG. 20, the 3D models of the robot 10 and the scanner 50 are displayed, and the path of the laser light LA is displayed in the second color.

By combining display by means of the color bar 322 and display of the state of the robot, etc., using the slider, the operator can discover wasteful times in the welding operation, whereby efficiency of the welding operation can be further increased.

When the preview button 323 is pressed, an animation of the models of the robot 10, scanner 50, and workpiece W, as well as the laser light irradiation is displayed in accordance with the simulation results of the operation program.

Various adjustment menus provided in accordance with the currently selected tab 311 are displayed on the right side of the screen of the GUI 300. The adjustment menus of the tab 311 include adjustment contents related to the operation programs as a whole. Fields 411 to 414 are related to the operation program of the scanner 50. Field 411 is a field for designating the ID of the operation program of the scanner 50, field 412 is a field which displays the operation program name, field 413 is a field in which the welding time of the operation program is displayed, and field 414 is a field in which the correction amount of the operation program of the robot and the operation program of the scanner 50 described with reference to FIGS. 14A to 17 are designated.

Furthermore, the adjustment menus of the tab 311 include a button 421 for indicating that the plurality of welding points selected in the welding point list box 302 lie within the same plane, and a button 422 indicating that the plurality of welding points selected by the user in the welding point list box 302 are included on the same motion path. Furthermore, the adjustment menus of the tab 311 include a field 425 for designating the operation speed of the operation command for welding the welding points selected in the welding point list box, a field 426 for designating the operation command start margin (approach distance), and a field 427 for designating an operation command end margin. Since the robot accelerates immediately after the start of the operation command, there is a problem in that if welding is performed during the acceleration, the weld may not be stable. Thus, by ensuring a start margin, welding can be performed when the robot 10 moves at a constant speed as expected. Likewise, since the robot decelerates when the operation command ends, there is problem in that if welding is performed during the deceleration, the weld may not be stable. Thus, by ensuring an end margin, welding can be performed when the robot moves at a constant speed as expected. By operating the program generation button 324, the operation program generation process can be carried out again using the various setting values set in the adjustment menus.

Figure 21:
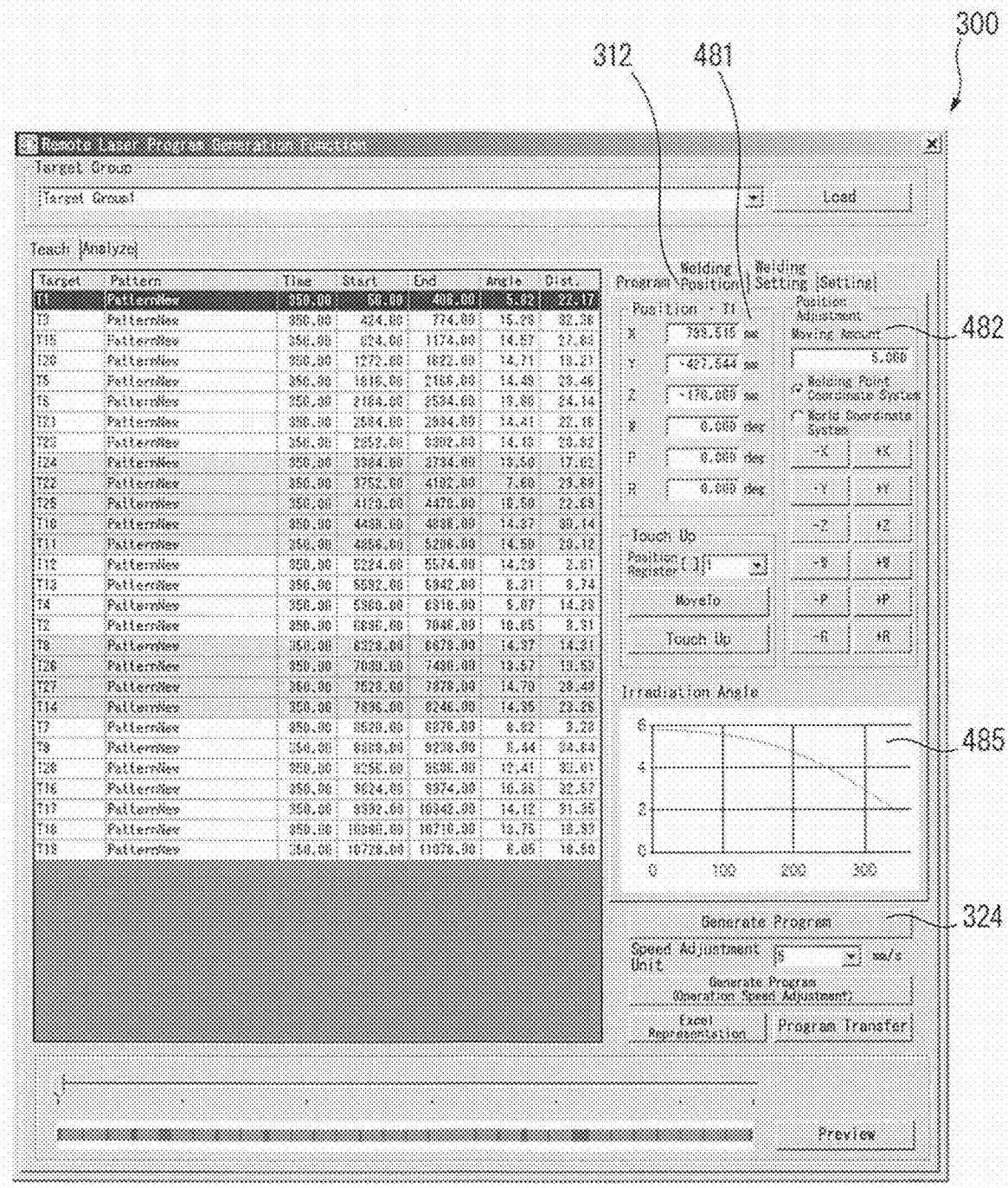
FIG. 21 is a view showing an example of a GUI displayed on the display screen of the laser machining teaching device.

FIG. 21 shows the GUI 300 in a state in which the tab 312 has been selected. The tab 312 includes various adjustment menus related to the welding position. The adjustment menus of the tab 312 include a box 481 displaying the position of the welding point selected in the welding point list box 302, and a position adjustment box 482 in which an instruction to change the position of the welding point can be input. The adjustment menus of the tab 312 further includes a graph 485 which represents the laser irradiation angle of the currently selected welding point ("T1"). In the graph 485, the horizontal axis represents time (unit: ms) and the vertical axis represents irradiation angle (unit: degrees). The graph 485 represents the change of the irradiation angle of the laser light (during the welding time) toward the welding point from the start of emission of the laser light until the end of emission of the laser light. The irradiation angle at the point at which emission of the laser light toward the welding point starts is comparatively large, and the irradiation angle at the point at which the irradiation period of the laser light ends (after 350 ms has elapsed) is comparatively small. By operating the program generation button 324, the operation program generation process can again be carried out using the various setting values set in the adjustment menus.

Figure 22:
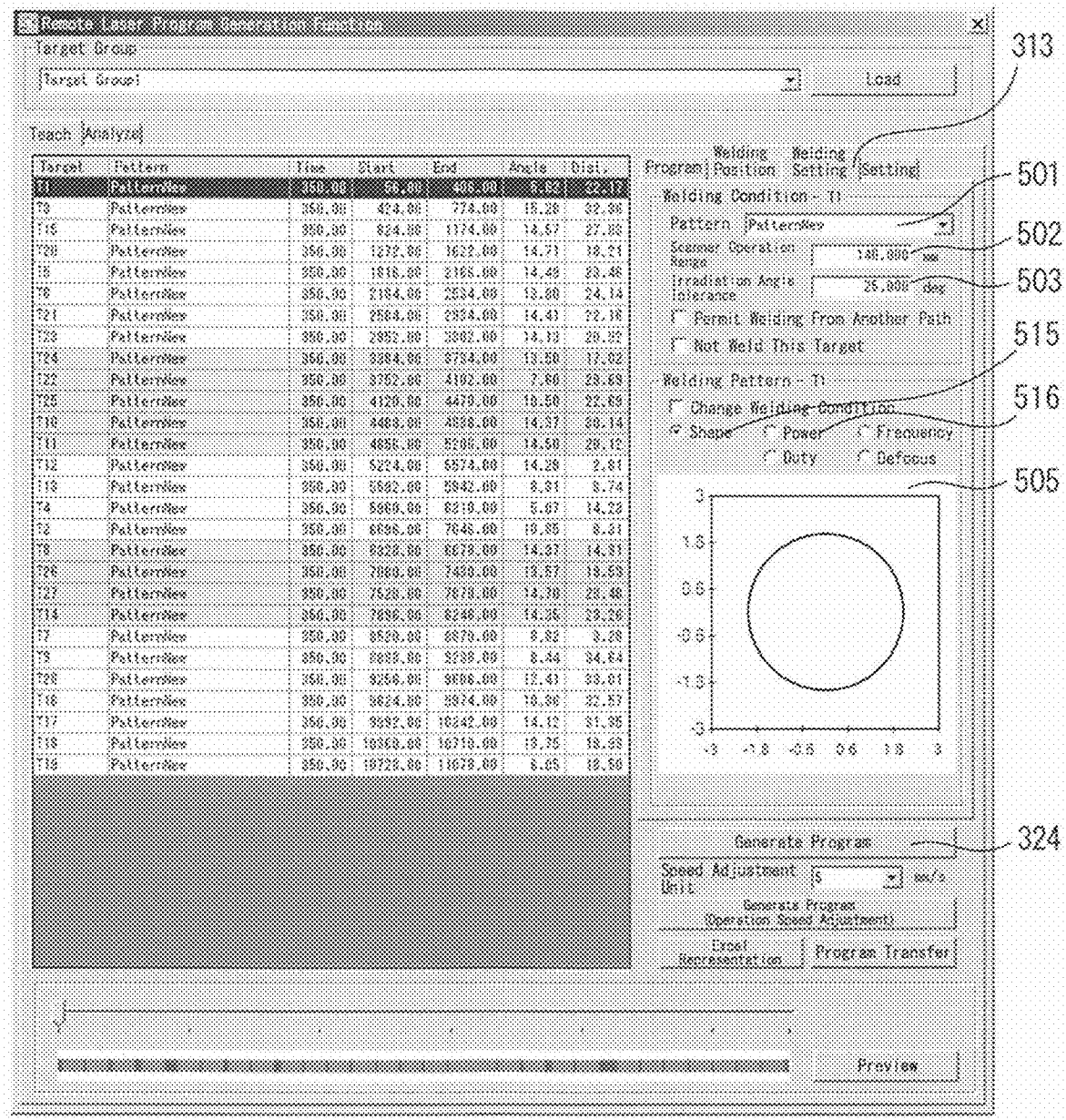
FIG. 22 is a view showing an example of a GUI displayed on the display screen of the laser machining teaching device.

FIG. 22 shows the GUI 300 in a state in which the tab 313 is selected. Tab 313 includes adjustment menus related to welding settings. The adjustment menus of the tab 313 include a field 501 for designating a welding pattern for the selected welding point ("T1"), a field 502 for designating the operation range of the scanner 50 when welding the welding point, and a field 503 for designating a tolerance of the irradiation angle when laser light is emitted toward the welding point. Furthermore, the adjustment menu screen of tab 313 includes a welding pattern display box 505 for graphically displaying the welding pattern of the selected welding point. By operating the welding pattern displayed in the pattern display box 505, the operator can change the welding pattern. By operating the program generation button 324, the operation program generation process can again be carried out using the various setting values set in the adjustment menus.

The welding pattern display box 505 includes a shape button, which is a radio button for designating the shape of the welding pattern, and a power button 516. In the display example shown in FIG. 22, the shape button 515, for designating the shape as the display form of the welding pattern, is designated.

Figure 23:
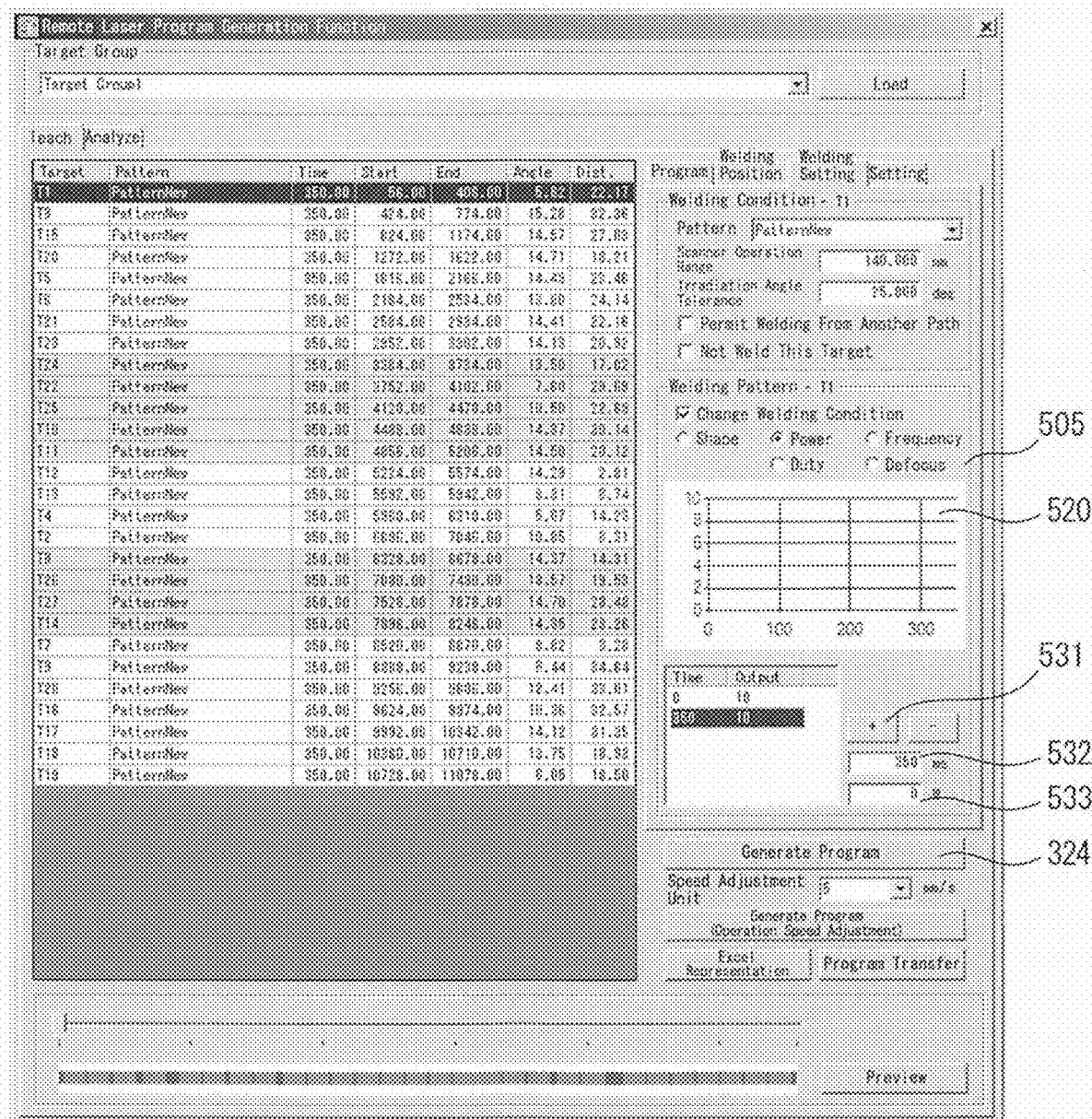
FIG. 23 is a view showing an example of a GUI displayed on the display screen of the laser machining teaching device.

FIG. 23 shows a display example when the power button 516, for designating power as the display form, is designated. As shown in FIG. 23, in this case, a graph 520 representing the welding pattern of the selected welding point is displayed in the pattern display box 505. In the graph 520, the horizontal axis represents time (unit: ms), and the vertical axis represents laser output (unit: W). The current graph 520 represents the performance of welding during the welding period at a constant laser output of 10 W. The operator can change the welding pattern. In this case, the operator inputs the time of the laser output change point into the field 532, inputs the laser output at that time into the field 533, and operates the button 531 for instructing to add laser output. The operator can obtain the desired laser output pattern by repeatedly carrying out such an operation.

Figure 24:
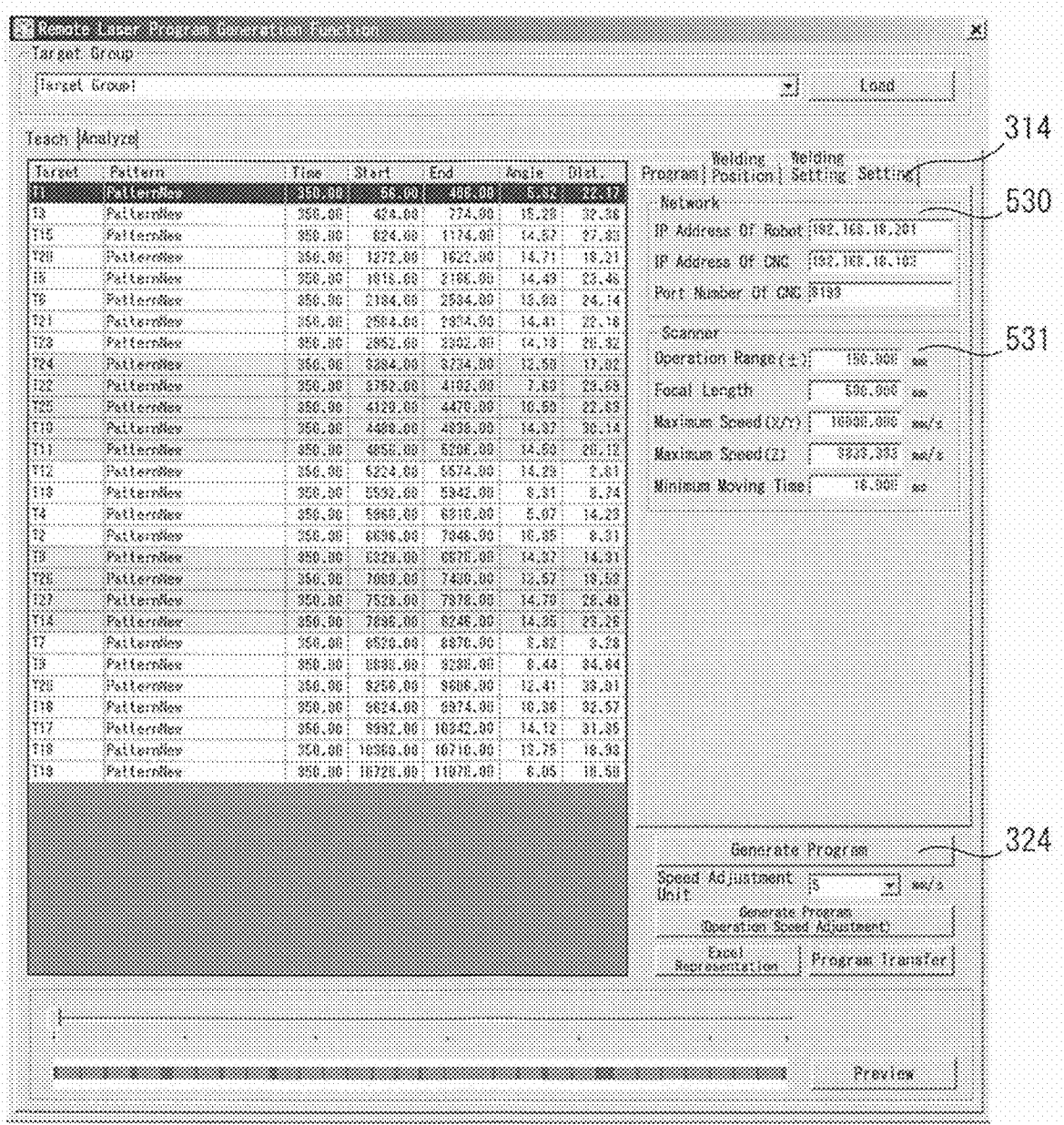
FIG. 24 is a view showing an example of a GUI displayed on the display screen of the laser machining teaching device.

FIG. 24 shows the GUI 300 in a state in which the tab 314 is selected. The setting menus of the tab 314 includes a setting box 530 for setting the network address of the scanner 50, and a setting box 531 for performing operation setting of the scanner 50. The setting box 531 includes fields for setting the operation range, focal length, maximum operation speed (XY directions), maximum speed (Z direction), and minimum movement time of the scanner 50. By operating the program generation button 324, the operation program generation process can again be carried out using the various setting values set in the adjustment menus.

Figure 25:
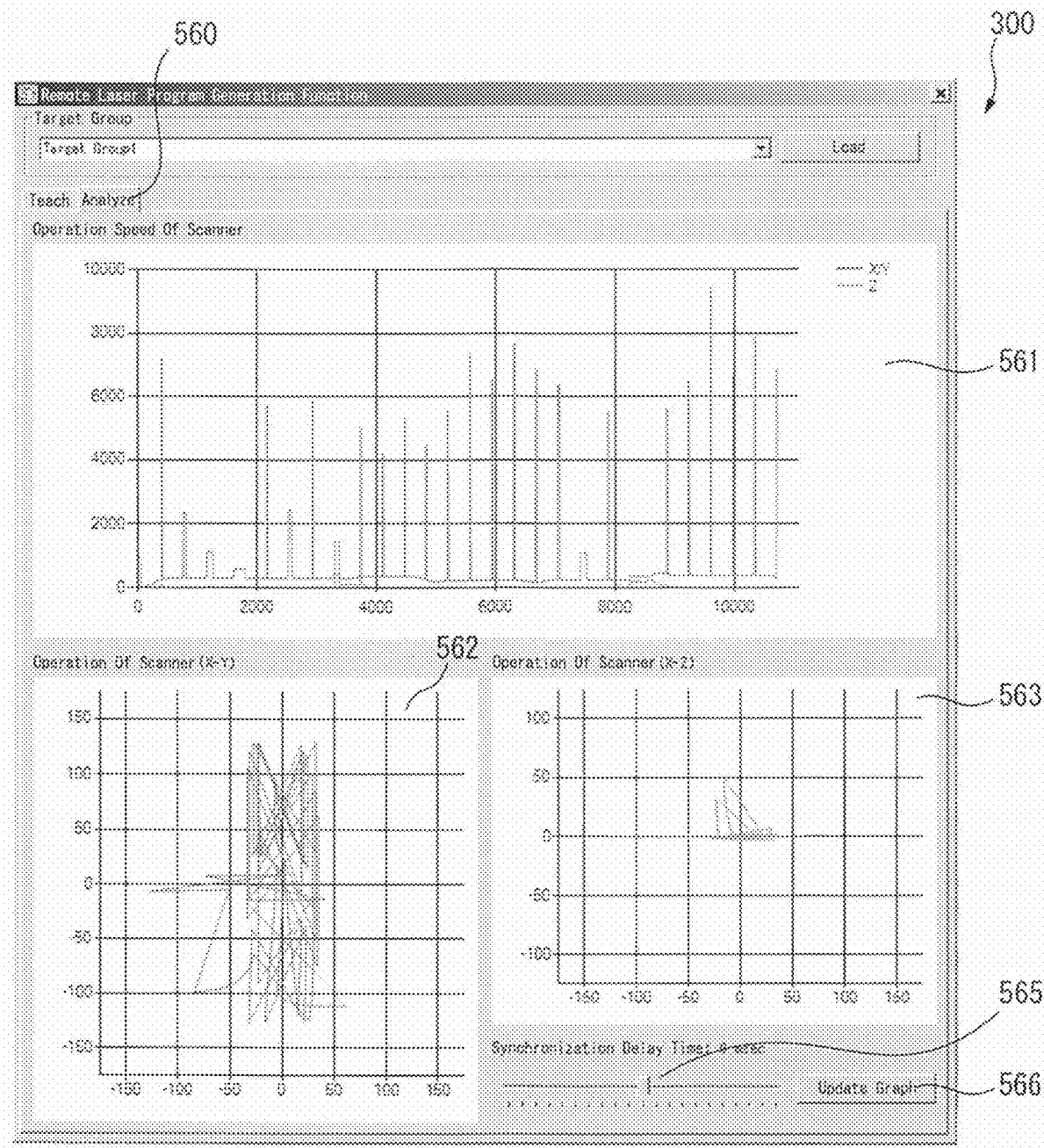
FIG. 25 is a view showing an example of a GUI displayed on the display screen of the laser machining teaching device.

FIG. 25 shows a display example in the case in which the analysis tab 560 located on the left side of the screen of the GUI 300 is selected. The screen of the analysis tab 560 shows three graphs 561 to 563 related to the operation of the scanner 50 obtained as simulation results. Graph 561 is a graph representing the speed of the scanner 50 in the XY directions. In graph 561, the horizontal axis represents time, and the vertical axis represents speed. Graph 562 is a graph representing the X and Y direction operations (the laser light irradiation position as viewed from the position of the lens of the scanner 50) of the scanner 50 during the welding operation in the local coordinate system of the scanner 50. In graph 562, the horizontal axis represents position in the X direction, and the vertical axis represents position in the Y direction. Graph 563 is a graph showing the operation of the scanner 50 in the Z direction during the welding operation in the local coordinate system of the scanner 50. The operation of the scanner 50 in the Z-direction represents an operation in the direction to drive the lens of the scanner 50 (i.e., adjustment of the focal length).

By operating the slide bar 565, designating the delay time (correction amount) of the scanner 50, and operating the graph update button 566, the operator can update the graphs according to results of the simulation performed using the designated delay time. As a result, the operator can confirm the degree of delay time necessary to enable the welding operation to be executed within the operation range of the scanner 50.

According to the present embodiment described above, the machining point groups can be appropriately grouped, and the appropriate operation path of the robot can be determined to reduce the required machining operation time.

Though the embodiments of the present invention have been described above, a person skilled in the art can understand that various modifications and alterations can be made without departing from the scope of the claims described below.

The program for performing the above-described various processes executed on the laser machining teaching device 1 can be recorded on various computer readable recording media.

Furthermore, in order to achieve the object of the present disclosure, the following various aspects and the effects thereof are provided. Note that numbers in parentheses in the following descriptions of the aspects correspond to reference numerals in the drawings of the present disclosure.

For example, the first aspect of the present disclosure provides a teaching device (1) for teaching a machining operation of a machining head which irradiates an object with laser light in a scanning manner and a movement operation of a robot which moves the machining head in a laser machining system, the teaching device comprising: a data input unit (110) which accepts input of positions of a plurality of machining points set on the object and a required machining time set for each of the machining points; a grouping unit (120) which divides the plurality of machining points into a plurality of machining point groups each including two or more machining points so that the machining head, which moves in each of the plurality of machining point groups at a constant speed, can sequentially machine each of the two or more machining points for the machining time, and so that an in-group non-machining time, during which the two or more machining points are not machined, can be minimized; a machining path determination unit (121) which determines, for each of the plurality of machining point groups, a machining path, on which the robot moves the machining head at a constant speed in each of the plurality of machining point groups, so that the shortest distances from the machining path to the two or more machining points are smaller than or equal to a scanning operation range of the machining head, and that an in-group movement time for completing machining of the two or more machining points is shortest; a teaching process adjustment unit (130) which adjusts a machining order of the two or more machining points in eh of the machining point groups and an operation order of the plurality of machining point groups, obtained as a result of processing of the grouping unit and the machining path determination unit, so as to minimize a distance between the machining point processed last in a machining point group and the machining point processed first in a subsequent machining point group, and which optimizes the grouping of the plurality of machining point groups so as to minimize a total movement time for completing machining of all of the plurality of machining points; and a teaching data output unit (140) which outputs, as teaching data, machining execution positions on the machining path of each of the plurality of machining point groups obtained as a result of processing of the teaching process adjustment unit.

According to the first aspect, the machining point groups can be appropriately grouped, and the appropriate operation path of the robot can be determined to reduce the required machining operation time.

The second aspect of the present disclosure provides the laser machining teaching device (1) according to the first aspect above, wherein the teaching process adjustment unit (130) determines a fastest movement speed which enables machining, for the required machining time, for each of the plurality of machining points set on the object by executing a simulation operation using three-dimensional model data of the machining head and the robot, the machining path, the machining order of the machining points, and the operation order of the plurality of machining point groups, and the teaching data output unit (140) further outputs the fastest movement speed as teaching data.

The third aspect of the present disclosure provides the laser machining teaching device (1) according to the first aspect or the second aspect above, wherein the grouping unit (120) performs grouping, using the positions and the required machining times of the plurality of machining points, so as to reduce variation, between the plurality of machining point groups, in regard to the degree of concentration of the required machining times of the two or more machining points of each of the plurality of machining point groups.

The fourth aspect of the present disclosure provides the laser machining teaching device (1) according to the third aspect above, wherein the grouping unit (120) performs grouping so that the degree of concentration of the required machining times of the two or more machining points of each of the plurality of machining point groups is unified between the plurality of machining point groups.

The fifth aspect of the present disclosure provides the laser machining teaching device (1) according to any one of the first aspect through the fourth aspect above, wherein the teaching process adjustment unit (130) executes a simulation operation using three-dimensional data of the machining head and the robot, the machining path, the machining order of the machining points, and the operation order of the plurality of machining point groups, and determines a machinable period on the machining path for each of the machining points so that, in the in the machinable period, machining of each of the machining points can be performed, for a time larger than or equal to the machining time, with the laser light without interruption by a part of the object, and when there are at least two machining points among the plurality of machining points having the machinable periods overlapping each other on the machining path, the teaching process adjustment unit sets, for the at least two machining points, the machining order on the machining path so as to satisfy the respective required machining times for all of the at least two machining points without depending on start points in chronological order of the machinable periods of the at least two machining points on the machining path.

The sixth aspect of the present disclosure provides the laser machining teaching device (1) according to any one of the first aspect through the fifth aspect above, further comprising an operation program generation unit (140) which generates a robot operation program for the robot and a machining head operation program for the machining head using the teaching data.

The seventh aspect of the present disclosure provides the laser machining teaching device (1) according to the sixth aspect above, further comprising: a laser light movement trajectory acquisition unit (172) which determines a movement trajectory of the laser light as viewed from a coordinate system fixed to the machining head when the machining head machines all of the plurality of machining points while the robot moves; and a maximum execution time difference value acquisition unit (170) which determines a maximum value of an execution time difference that can be set between an execution time of the robot operation program and an execution time of the machining head operation program in a condition where, when the movement trajectory of the laser light is determined by the laser light movement trajectory acquisition unit by performing a simulation operation by setting the execution time difference between the execution time of the robot operation program and the execution time of the machining head operation program, the movement trajectory of the laser light is within a scanning range of the machining head, wherein the operation program generation unit generates the robot operation program and the machining head operation program so as to generate the maximum value of the execution time difference between the robot operation program and the machining head operation program.

The eighth aspect of the present disclosure provides a teaching method for teaching a machining operation of a machining head (50) which irradiates an object with laser light in a scanning manner and a movement operation of a robot (10) which moves the machining head in a laser machining system (100), the method comprising the steps of: accepting input of positions of a plurality of machining points set on the object and a required machining time set for each of the machining points; dividing the plurality of machining points into a plurality of machining point groups each including two or more machining points so that the machining head, which moves in each of the plurality of machining point groups at a constant speed, can sequentially machine each of the two or more machining points for the machining time, and so that an in-group non-machining time, during which the two or more machining points are not machined, can be minimized; determining, for each of the plurality of machining point groups, a machining path, on which the robot moves the machining head at a constant speed in each of the plurality of machining point groups, so that the shortest distances from the machining path to the two or more machining points are smaller than or equal to a scanning operation range of the machining head, and that an in-group movement time for completing machining of the two or more machining points is shortest; adjusting a machining order of the two or more machining points in each of the machining point groups, and an operation order for the plurality of machining point groups obtained as a result of processing of the grouping unit and the machining path determination unit so as to minimize a distance between the machining point processed last in a machining point group and the machining point processed first in a subsequent machining point group, and performing a teaching process adjustment which optimizes the grouping of the plurality of machining point groups so as to minimize a total movement time for completing machining of all of the plurality of machining points; and outputting as teaching data, machining execution positions on the machining path of each of the plurality of machining point groups obtained as a result of processing of the teaching process adjustment.

The ninth aspect of the present disclosure provides a non-transitory computer-readable storage medium storing a program which executes, on a computer, a teaching method for teaching a machining operation of a machining head (50) which irradiates an object with laser light in a scanning manner and a movement operation of a robot (10) which moves the machining head in a laser machining system (100), wherein when the program is executed by a processor, the following processes are executed: a process for accepting input of positions of a plurality of machining points set on the object and a required machining time set for each of the machining points; a process for dividing the plurality of machining points into a plurality of machining point groups each including two or more machining points so that the machining head, which moves in each of the plurality of machining point groups at a constant speed, can sequentially machine each of the two or more machining points for the machining time, and so that an in-group non-machining time, during which the two or more machining points are not machined, can be minimized; a process for determining, for each of the plurality of machining point groups, a machining path, on which the robot moves the machining head at a constant speed in each of the plurality of machining point groups, so that the shortest distances from the machining path to the two or more machining points are smaller than or equal to a scanning operation range of the machining head, and that an in-group movement time for completing machining of the two or more machining points is shortest; a process for adjusting a machining order of the two or more machining points in each of the machining point groups, and an operation order for the plurality of machining point groups obtained as a result of processing of the grouping unit and the machining path determination unit so as to minimize a distance between the machining point processed last in a machining point group and the machining point processed first in a subsequent machining point group, and performing a teaching process adjustment which optimizes the grouping of the plurality of machining point groups so as to minimize a total movement time for completing machining of all of the plurality of machining points; and a process for outputting, as teaching data, machining execution positions on the machining path of each of the plurality of machining point groups obtained as a result of processing of the teaching process adjustment.

The invention claimed is:

1. A teaching device for teaching a machining operation of a machining head configured to irradiate an object with laser light in a scanning manner and a movement operation of a robot configured to move the machining head in a laser machining system, the teaching device comprising:
a processor configured to
accept input of positions of a plurality of machining points set on the object and a machining time set for each of the plurality of machining points,
divide the plurality of machining points into a plurality of machining point groups each including two or more machining points to allow the machining head, configured to move in each of the plurality of machining point groups at a constant speed, to sequentially machine each of the two or more machining points for the machining time, and to minimize an in-group non-machining time, during which the two or more machining points are not machined,
determine, for each of the plurality of machining point groups, a machining path, on which the robot moves the machining head at a constant speed in each of the plurality of machining point groups, wherein each distance between the machining path and each of the two or more machining points is at a shortest distance, the shortest distance is smaller than or equal to a scanning operation range of the machining head, and an in-group movement time, among a plurality of in-group movement times for completing machining of the two or more machining points, is shortest,
adjust a machining order of the two or more machining points in each of the plurality of machining point groups and an operation order of the plurality of machining point groups to minimize a distance between a machining point processed last in a machining point group of the plurality of machining point groups and a machining point processed first in a subsequent machining point group of the plurality of machining point groups, and optimize grouping of the plurality of machining point groups to minimize a total movement time for completing machining of all of the plurality of machining points,
output, as teaching data, machining execution positions on the machining path of each of the plurality of machining point groups, and
generate a robot operation program for the robot and a machining head operation program for the machining head using the teaching data.

2. The teaching device according to claim 1, wherein the processor is configured to
determine a fastest movement speed which enables machining, for the machining time, for each of the plurality of machining points set on the object by executing a simulation operation using three-dimensional model data of the machining head and the robot, the machining path, the machining order of the two or more machining points in each of the plurality of machining point groups, and the operation order of the plurality of machining point groups, and
further output the fastest movement speed as the teaching data.

3. The teaching device according to claim 1, wherein
the processor is configured to perform grouping, using the positions of the plurality of machining points and the machining time for each of the plurality of machining points, to reduce variation, between the plurality of machining point groups, in regard to a degree of concentration of the machining time of the two or more machining points of each of the plurality of machining point groups.

4. The teaching device according to claim 3, wherein
the processor is configured to perform grouping to unify the degree of concentration of the machining time of the two or more machining points of each of the plurality of machining point groups between the plurality of machining point groups.

5. The teaching device according to claim 1, wherein
the processor is configured to
execute a simulation operation using three-dimensional data of the machining head and the robot, the machining path, the machining order of the two or more machining points in each of the plurality of machining point groups, and the operation order of the plurality of machining point groups,
determine a machinable period on the machining path for each of the plurality of machining points where, in the machinable period, machining of each of the plurality of machining points can be performed, for a time larger than or equal to the machining time, with the laser light without interruption by a part of the object, and
set, in response to at least two machining points among the plurality of machining points having machinable periods overlapping each other on the machining path, for the at least two machining points, a machining order on the machining path to satisfy machining times for all of the at least two machining points without depending on start points in chronological order of the machinable periods of the at least two machining points on the machining path.

6. The teaching device according to claim 1, wherein
the processor is configured to
determine a movement trajectory of the laser light as viewed from a coordinate system fixed to the machining head when the machining head machines all of the plurality of machining points while the robot moves,
determine a maximum value of an execution time difference that is set between an execution time of the robot operation program and an execution time of the machining head operation program in a condition where, in response to the movement trajectory of the laser light being determined by setting the execution time difference between the execution time of the robot operation program and the execution time of the machining head operation program and performing a simulation operation, the movement trajectory of the laser light is within a scanning range of the machining head, and
generate the robot operation program and the machining head operation program to generate the maximum value of the execution time difference between the robot operation program and the machining head operation program.

7. A teaching method for teaching a machining operation of a machining head which irradiates an object with laser light in a scanning manner and a movement operation of a robot which moves the machining head in a laser machining system, the teaching method comprising:
accepting input of positions of a plurality of machining points set on the object and a machining time set for each of the plurality of machining points;
dividing the plurality of machining points into a plurality of machining point groups each including two or more machining points to allow the machining head, configured to move in each of the plurality of machining point groups at a constant speed, to sequentially machine each of the two or more machining points for the machining time, and to minimize an in-group non-machining time, during which the two or more machining points are not machined;
determining, for each of the plurality of machining point groups, a machining path, on which the robot moves the machining head at a constant speed in each of the plurality of machining point groups, wherein each distance between the machining path and each of the two or more machining points is at a shortest distance, the shortest distance is smaller than or equal to a scanning operation range of the machining head, and an in-group movement time, among a plurality of in-group movement times for completing machining of the two or more machining points, is shortest;
adjusting a machining order of the two or more machining points in each of the plurality of machining point groups, and an operation order for the plurality of machining point groups to minimize a distance between a machining point processed last in a machining point group of the plurality of machining point groups and a machining point processed first in a subsequent machining point group of the plurality of machining point groups, and performing a teaching process adjustment to optimize grouping of the plurality of machining point groups to minimize a total movement time for completing machining of all of the plurality of machining points;
outputting, as teaching data, machining execution positions on the machining path of each of the plurality of machining point groups obtained as a result of processing of the teaching process adjustment; and
generating a robot operation program for the robot and a machining head operation program for the machining head using the teaching data.

8. A non-transitory computer-readable storage medium storing a program that causes a processor to perform a teaching method for teaching a machining operation of a machining head configured to irradiate an object with laser light in a scanning manner and a movement operation of a robot configured to move the machining head in a laser machining system, wherein when the program is executed by the processor, the program causes the processor to perform the teaching method comprising:
accepting input of positions of a plurality of machining points set on the object and a machining time set for each of the plurality of machining points;
dividing the plurality of machining points into a plurality of machining point groups each including two or more machining points to allow the machining head, configured to move in each of the plurality of machining point groups at a constant speed, to sequentially machine each of the two or more machining points for the machining time, and to minimize an in-group non-machining time, during which the two or more machining points are not machined;

determining, for each of the plurality of machining point groups, a machining path, on which the robot moves the machining head at a constant speed in each of the plurality of machining point groups, wherein each distance between the machining path and each of the two or more machining points is at a shortest distance, the shortest distance is smaller than or equal to a scanning operation range of the machining head, and an in-group movement time, among a plurality of in-group movement times for completing machining of the two or more machining points, is shortest;

adjusting a machining order of the two or more machining points in each of the plurality of machining point groups, and an operation order for the plurality of machining point groups to minimize a distance between a machining point processed last in a machining point group of the plurality of machining point groups and a machining point processed first in a subsequent machining point group of the plurality of machining point groups, and performing a teaching process adjustment to optimize grouping of the plurality of machining point groups to minimize a total movement time for completing machining of all of the plurality of machining points;

outputting, as teaching data, machining execution positions on the machining path of each of the plurality of machining point groups obtained as a result of processing of the teaching process adjustment; and generating a robot operation program for the robot and a machining head operation program for the machining head using the teaching data.

* * * * *